(12) United States Patent
Toma et al.

(10) Patent No.: US 9,654,823 B2
(45) Date of Patent: May 16, 2017

(54) FILE GENERATING METHOD AND FILE GENERATING APPARATUS

(71) Applicant: Panasonic Corporation, Osaka (JP)

(72) Inventors: Tadamasa Toma, Osaka (JP); Masaya Yamamoto, Kyoto (JP); Hiroshi Yahata, Osaka (JP); Tomoki Ogawa, Osaka (JP); Masayuki Kozuka, Osaka (JP); Kaoru Murase, Nara (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/004,565

(22) Filed: Jan. 22, 2016

(65) Prior Publication Data

US 2016/0156968 A1 Jun. 2, 2016

Related U.S. Application Data

(63) Continuation of application No. PCT/JP2014/005634, filed on Nov. 10, 2014.

(Continued)

(30) Foreign Application Priority Data

Oct. 31, 2014 (JP) .................................. 2014-222795

(51) Int. Cl.
*H04N 5/917* (2006.01)
*H04N 21/4402* (2011.01)
(Continued)

(52) U.S. Cl.
CPC ....... *H04N 21/4402* (2013.01); *G11B 27/031* (2013.01); *G11B 27/034* (2013.01);
(Continued)

(58) Field of Classification Search
CPC .................... H04N 21/4402; G11B 27/031
(Continued)

(56) References Cited

U.S. PATENT DOCUMENTS

2006/0245729 A1 11/2006 Itoh et al.
2007/0143633 A1* 6/2007 Shiiba .................... G06F 21/10
713/193

(Continued)

FOREIGN PATENT DOCUMENTS

JP 2012-175608 9/2012

OTHER PUBLICATIONS

The Extended European Search Report issued Aug. 11, 2016 in corresponding European Application No. 14862939.7.

(Continued)

*Primary Examiner* — Thai Tran
*Assistant Examiner* — Mishawn Hunter
(74) *Attorney, Agent, or Firm* — Wenderoth, Lind & Ponack, L.L.P.

(57) ABSTRACT

A file generating method according to one aspect of the present disclosure is a file generating method for generating an MP4 file, the file generating method including: step S11 of acquiring an original file made in a file format different from MP4; step S12 of acquiring a difference file including data that is not included in the original file; step S13 of acquiring a procedure file indicating a procedure for generating the MP4 file; and step S14 of generating the MP4 file by combining the data included in the difference file and data included in the original file in accordance with the procedure indicated in the procedure file.

11 Claims, 15 Drawing Sheets

Related U.S. Application Data

(60) Provisional application No. 61/904,734, filed on Nov. 15, 2013, provisional application No. 61/905,907, filed on Nov. 19, 2013.

(51) Int. Cl.

| | | |
|---|---|---|
| *G11B 27/034* | (2006.01) | |
| *H04N 5/85* | (2006.01) | |
| *H04N 9/82* | (2006.01) | |
| *H04N 21/2389* | (2011.01) | |
| *H04N 21/4405* | (2011.01) | |
| *H04N 21/854* | (2011.01) | |
| *G11B 27/031* | (2006.01) | |
| *H04N 9/804* | (2006.01) | |

(52) U.S. Cl.
CPC ............. *H04N 5/85* (2013.01); *H04N 9/8045* (2013.01); *H04N 9/8211* (2013.01); *H04N 21/23895* (2013.01); *H04N 21/4405* (2013.01); *H04N 21/440218* (2013.01); *H04N 21/85406* (2013.01)

(58) Field of Classification Search
USPC .................................. 386/241, 248, 329, 331
See application file for complete search history.

(56) References Cited

U.S. PATENT DOCUMENTS

| | | | | |
|---|---|---|---|---|
| 2007/0280351 | A1* | 12/2007 | Takamura | ............ H04N 19/176 375/240.11 |
| 2010/0232504 | A1* | 9/2010 | Feng | .................... H04N 19/176 375/240.13 |
| 2011/0164111 | A1* | 7/2011 | Karaoguz | ................. G06F 3/14 348/43 |

OTHER PUBLICATIONS

The Extended European Search Report issued Sep. 15, 2016 in corresponding European Application No. 14862939.7.
Anonymous: "WD of ISO/IEC 13818-1:201X/Amd 4 Common Encryption format for MPEG-2 Transport Stream", 101. MPEG Meeting; Jul. 16, 2012-Jul. 20, 2012; Stockholm; (Motion Picture Expert Group or ISO/IEC JTC1/SC29/WG11), No. N12862, Jul. 29, 2012 (Jul. 29, 2012), XP030019334.
International Search Report of PCT application No. PCT/JP2014/005634 dated Feb. 3, 2015.

\* cited by examiner

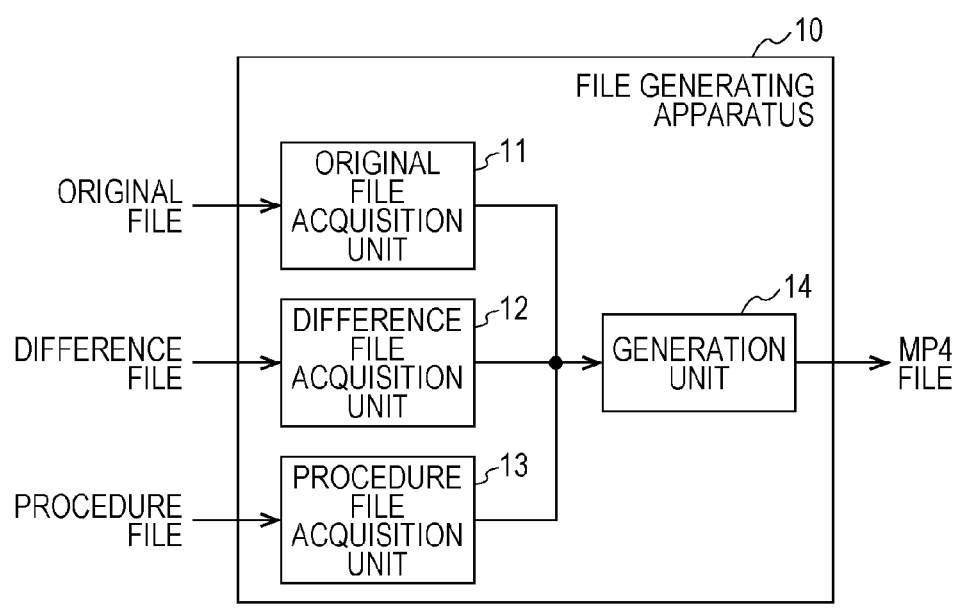

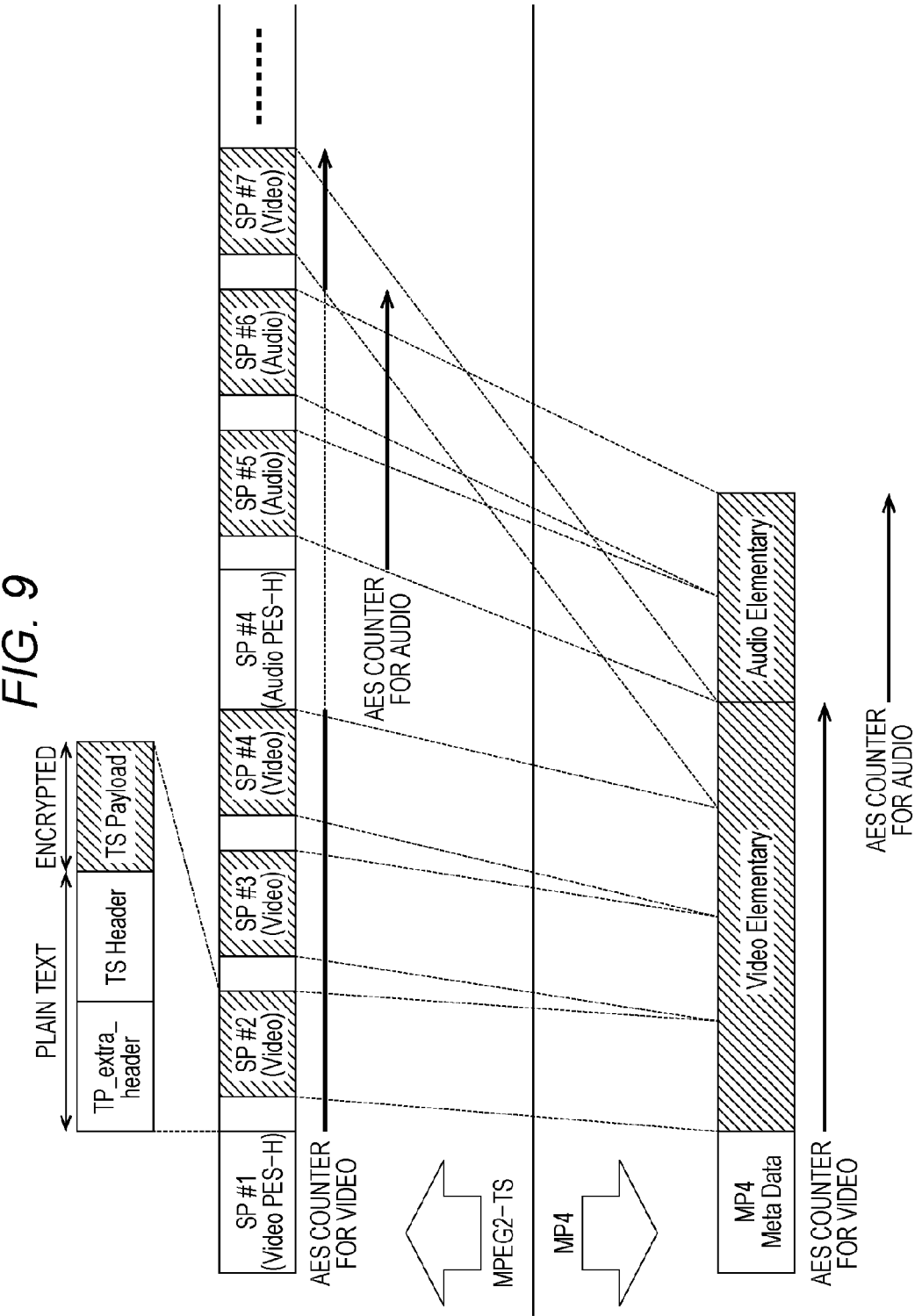

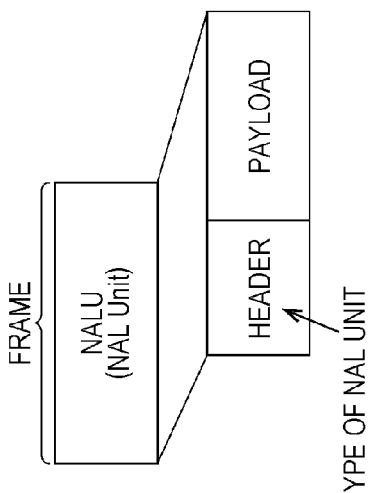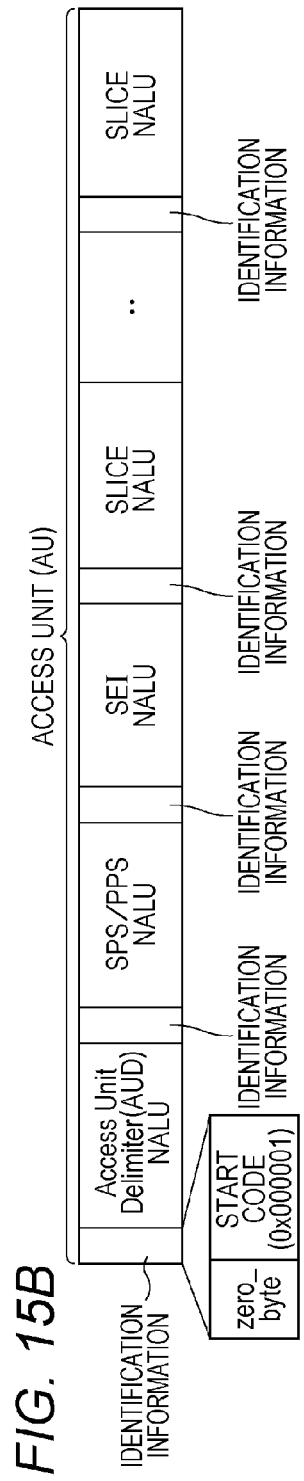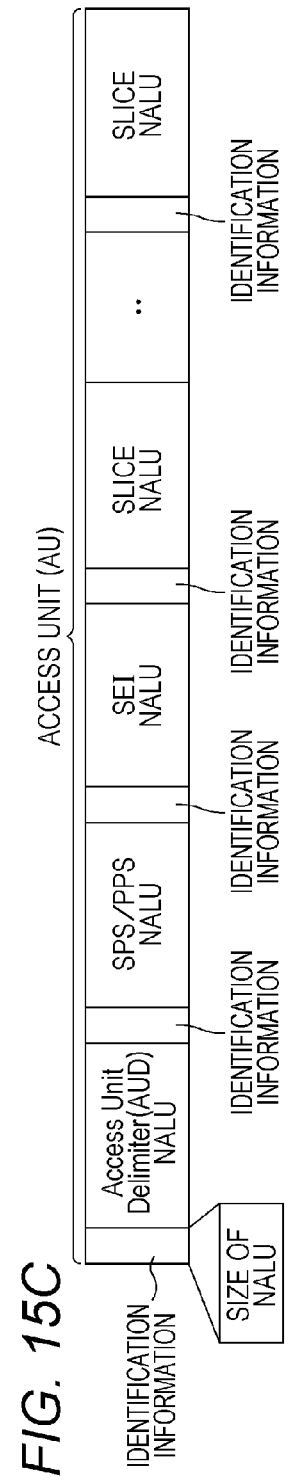

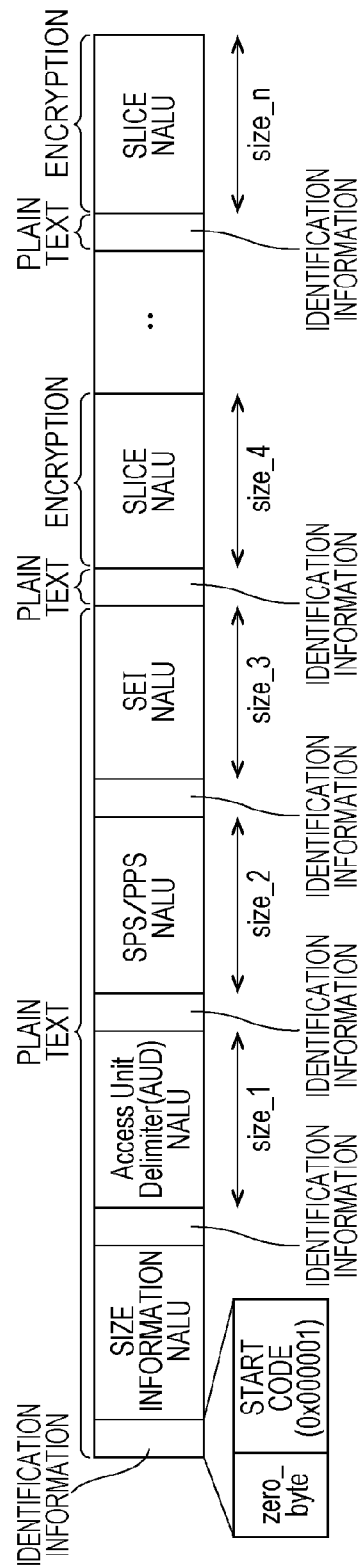

FILE GENERATING METHOD AND FILE GENERATING APPARATUS

BACKGROUND

1. Technical Field

The present disclosure relates to a file generating method and file generating apparatus that generate MP4 files.

2. Description of the Related Art

A file format used for conventional optical discs is an MPEG2-TS (MPEG-2 Transport Stream) scheme prescribed by ISO/IEC 138181-1. Hereinafter, the MPEG2-TS scheme is just referred to as MPEG2-TS. That is, a file made through multiplexing of a video stream, voice stream, and subtitle stream in an MPEG2-TS file format is recorded in an optical disc. Specifically, according to MPEG2-TS, streams such as a video stream, voice stream, and subtitle stream are each divided into a plurality of 188-byte TS packets, multiplexed, and recorded in an optical disc. This MPEG2-TS is optimized for broadcast or a medium like an optical disc that transmits or records data that is read and processed sequentially from top. Therefore, even a consumer electronic product with relatively small buffer capacity can read, decrypt, and play the stream efficiently.

In contrast, the file format currently used in content delivery over a network these days is the MP4 scheme prescribed by ISO/IEC 14496-12. Hereinafter, the MP4 scheme is just referred to as MP4. MP4 adopts extremely flexible data structure on an assumption of application of MP4 to a medium that allows random access, such as a HDD (Hard Disk Drive) and a flash memory. In a general usage pattern of this MP4, a stream such as a video stream, voice stream, and subtitle stream is divided into several-second units called fragment, and these fragments are arranged sequentially to constitute one file.

An optical disc is expected to be still utilized often as a medium for distributing quality content, such as 4K, that is expected to be widely used in the future, due to a problem of a price per bit. In contrast, a smart phone or tablet, which fails to have an optical disc drive, is used as a terminal for receiving and playing content distribution over a network, through utilization of high portability or recent large screen and high resolution. For this reason, a smart phone or tablet has a lot of functions and processing that conform to MP4, and application of MPEG2-TS shows little progress.

Therefore, when content that is an MPEG2-TS file distributed with an optical disc is copied to the smart phone or tablet, the file format of the content may be converted into MP4 (for example, refer to Patent Literature 1). An MP4 file, which is a file of MP4, is generated by such conversion.

CITATION LIST

Patent Literature

PTL 1: Unexamined Japanese Patent Publication No. 2012-175608

SUMMARY OF THE INVENTION

In one general aspect, the techniques disclosed here feature a file generating method for generating an MP4 file, the file generating method including: acquiring an original file made in a file format different from MP4; acquiring a difference file including data that is not included in the original file; acquiring a procedure file indicating a procedure for generating the MP4 file; and generating the MP4 file by combining the data included in the difference file with data included in the original file in accordance with the procedure indicated in the procedure file.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 4 is a diagram illustrating a method for creating an actual Elementary Stream from a plurality of TS Payloads;

FIG. 5 is a block diagram illustrating a configuration of a file generating apparatus according to an exemplary embodiment;

FIG. 9 is a diagram for describing the file generating method according to variation 1 of the exemplary embodiment;

FIG. 15A is a diagram illustrating schematic structure of an NAL unit according to variation 2 of the exemplary embodiment;

FIG. 15B is a diagram illustrating an example of a storage format of the NAL unit in MPEG2-TS according to variation 2 of the exemplary embodiment;

FIG. 15C is a diagram illustrating an example of the storage format of the NAL unit in MP4 according to variation 2 of the exemplary embodiment;

FIG. 16A is a diagram illustrating a configuration example of an access unit in a transport stream according to variation 2 of the exemplary embodiment;

FIG. 16B is a diagram illustrating an example of syntax of size information included in a size information NAL unit according to variation 2 of the exemplary embodiment;

FIG. 16C is a diagram illustrating another example of syntax of the size information included in the size information NAL unit according to variation 2 of the exemplary embodiment.

DETAILED DESCRIPTION

Underlying Knowledge Forming Basis of the Present Disclosure

The present inventors have found out that the following problems arise regarding a file generating method of the above Patent Literature 1 described in the column of "BACKGROUND ART".

The file generating method of the above-described Patent Literature 1 needs to temporarily restore content multiplexed by MPEG2-TS to each stream, such as a video stream, voice stream, and subtitle stream, and then to convert a file format of the content into MP4. Also, commercial content distributed with an optical disc is typically encrypted. Therefore, in conversion, it is necessary to decrypt the content temporarily, to convert the file format, and then to encrypt the content again. Hereinafter, structure of content of MPEG2-TS, etc. will be described in detail.

Figure 1:
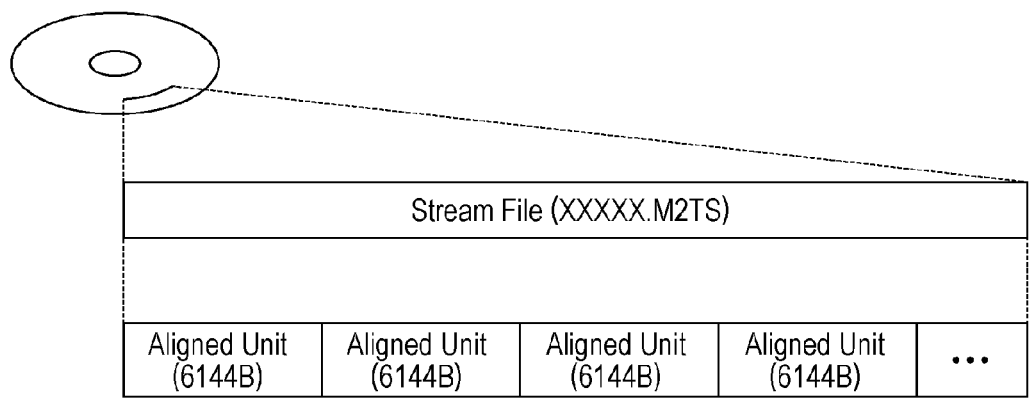
FIG. 1 is a diagram schematically illustrating an example of content structure of MPEG2-TS stored in an optical disc.

FIG. 1 is a diagram schematically illustrating an example of content structure of MPEG2-TS stored in an optical disc. A Stream File is stored as content in the optical disc. Although only one Stream File is stored in the optical disc in the example illustrated in FIG. 1, a plurality of Stream Files may be stored. Also, the Stream File is recorded here with a file name of XXXXX.M2TS. A number is described in XXXXX. If a plurality of pieces of content is stored, it is possible to manage those pieces of content individually with this number.

The Stream File is divided into a plurality of units, each of which is a 6144-byte unit called Aligned Unit. The Aligned Unit is a unit of encryption. Note that a data size of the Stream File may not necessarily be a multiple of 6144 bytes. When the data size of the Stream File is not a multiple of 6144 bytes, the data size of the Stream File is preferably adjusted to a multiple of 6144 bytes by a method such as storing NULL Data in a tail of the content.

Figure 2:
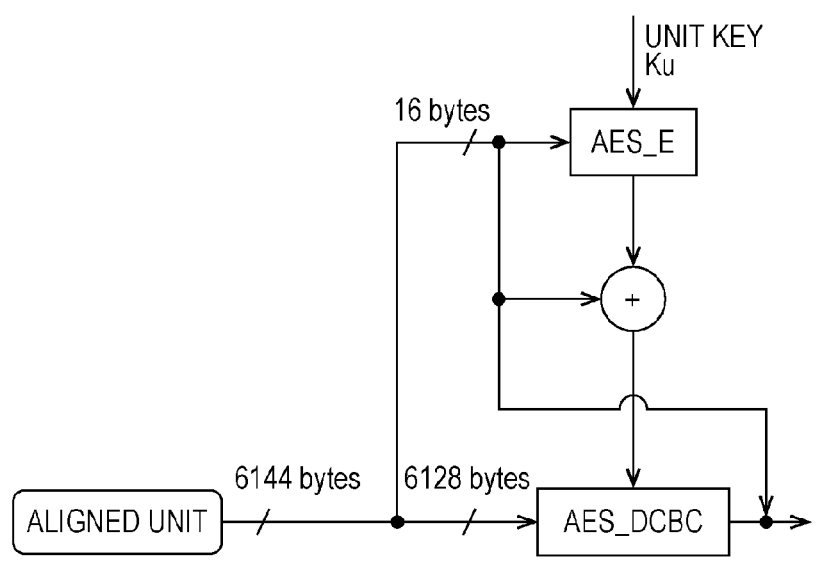
FIG. 2 is a diagram for describing a decryption method of an Aligned Unit.

FIG. 2 is a diagram for describing a decryption method of the Aligned Unit.

The content on the optical disc has been encrypted using a unit key Ku, which is data. In encryption, 6144-byte data included in the Aligned Unit is divided into 16-byte top data and remaining 6128-byte data, and the remaining 6128-byte data is encrypted.

In decryption of the Aligned Unit, AES_E first encrypts 16-byte top data in accordance with an AES (Advanced Encryption Standard) encryption scheme that uses the unit key Ku. Next, calculation of exclusive OR is performed between data obtained by this encryption and the 16-byte top data. AES_DCBC uses a result of this calculation of exclusive OR as a key to decrypt the remaining 6128-byte data in an AES-CBC (Cipher Block Chaining) mode. The 16-byte top data is added to data in plain text obtained by this decryption. As a result, 6144-byte plain text corresponding to the Aligned Unit is obtained.

Figure 3:
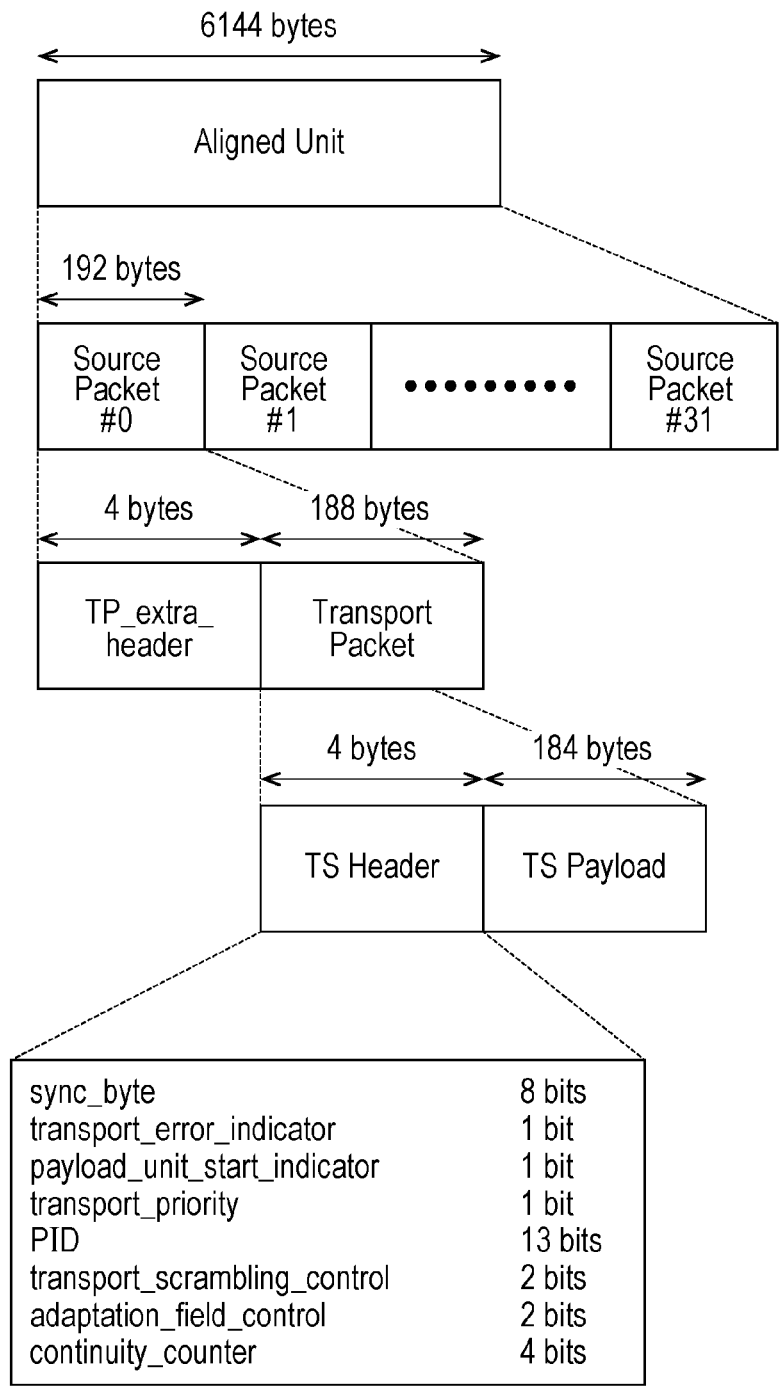
FIG. 3 is a diagram illustrating internal structure of the Aligned Unit in plain text.

FIG. 3 is a diagram illustrating internal structure of the Aligned Unit in plain text.

The Aligned Unit includes 32 Source Packets, each of which has 192 bytes. Each Source Packet includes a TP_extra_header, which is a 4-byte header, and a 188-byte Transport Packet, which is a TS packet. Furthermore, the 188-byte Transport Packet includes a 4-byte TS Header and a 184-byte TS Payload. The TS Header describes information that indicates an attribute of the TS Payload. Specifically, the TS Header includes sync_byte (8 bits), transport_error_indicator (1 bit), payload_unit_start_indicator (1 bit), transport_priority (1 bit), PID (13 bits), transport_scrambling_control (2 bits), adaptation_field_control (2 bits), and continuity_counter (4 bits). Here, PID is information for identifying a type of an elementary stream stored in the TS Payload, for example, video or voice. Also, even when there is a plurality of voice types, the voice type of the elementary stream can be identified by this PID.

FIG. 4 is a diagram illustrating a method for creating an actual Elementary Stream from a plurality of TS Payloads. A PES_Header and the Elementary Stream are made through connection of the plurality of TS Payloads to which identical PID is allocated. Here, the first TS Payload of the plurality of TS Payloads is formed to include the PES_Header. Note that a PES (Packetized Elementary Stream) or a PES packet is formed from the PES_Header and at least part of the Elementary Stream.

As described above, the MPEG2-TS file (Sterem File) is encrypted for each Aligned Unit. Therefore, in order to convert the file into an MP4 file, the above-described decryption is performed, and re-encryption is further performed. A conversion device, such as a smart phone or a tablet, has a problem that such decryption and encryption take time. Furthermore, since content in plain text is created temporarily, there is also a problem from a security viewpoint.

To solve such problems, a file generating method according to one aspect of the present disclosure is a file generating method for generating an MP4 file, the file generating method including: acquiring an original file made in a file format different from MP4; acquiring a difference file including data that is not included in the original file; acquiring a procedure file indicating a procedure for generating the MP4 file; and generating the MP4 file by combining the data included in the difference file with data included in the original file in accordance with the procedure indicated in the procedure file. For example, in acquisition of the original file, the original file made in a file format of MPEG2-TS is acquired.

This causes the MP4 file to be generated through combination of the data included in the difference file and the data included in the original file in accordance with the predetermined procedure. Therefore, this allows the MP4 file to be easily generated without restoring the original file formed in the file format such as MPEG2-TS to each stream such as a video stream and a voice stream. In addition, even if the original file is encrypted, it is not necessary to decrypt and re-encrypt the original file. Therefore, a processing load for generating the MP4 file may be reduced.

In addition, the original file, the difference file, and the procedure file may be acquired through reading of the original file, the difference file, and the procedure file, respectively, from an optical disc.

This allows all the files required for generation of the MP4 file to be acquired from one optical disc, and thus saves time and effort for searching for those files, and allows the MP4 file to be generated more easily.

Also, the procedure file may describe ranges of a plurality of respective sections included in the difference file, and ranges of a plurality of respective sections included in the original file, so that the ranges of the sections included in the difference file and the ranges of the sections included in the original file may be arranged alternately. In generation of the MP4 file, the MP4 file may be generated through combination of the sections indicated by the respective ranges in order of the respective ranges described in the procedure file.

This allows each section included in the MP4 file to be generated in order from top of the MP4 file, and since generation processing does not go backward, the MP4 file can be generated more easily.

Also, the ranges of the plurality of respective sections included in the difference file may be described in the procedure file in data size. The ranges of the plurality of respective sections included in the original file may be described in the procedure file in starting position and data size of the sections.

This allows appropriate sections to be copied or acquired from the difference file and the original file, and to be combined in accordance with description in the procedure file. Also, since the starting position is not used for description of the range of the section included in the difference file, the data size of the procedure file may be reduced.

Also, the data size of the MP4 file may be described in the procedure file. The file generating method may further determine whether a medium has free space for recording the MP4 file based on the data size of the MP4 file described in the procedure file.

Since this determines whether the medium has free space for recording the MP4 file, if the medium does not have enough free space, processing such as stopping generation of the MP4 file in advance can be performed. That is, occurrence of errors can be prevented.

In addition, an attribute of the MP4 file may be described in the procedure file, and the file generating method may further read the attribute described in the procedure file.

The allows previous determination to be made whether the desired MP4 file will be generated if the attribute of the MP4 file is read from the procedure file before generation of the MP4 file.

Also, a buffer size required for playback of the MP4 file may be described in the procedure file, and the file generating method may further read the buffer size described in the procedure file.

This allows determination to be made easily whether the MP4 file can be played without analysis of the MP4 file if the buffer size required for playback of the MP4 file is read from the procedure file.

Also, a first file name, which is a name of the original file, and a second file name, which is a name of the difference file, may be described in the procedure file. The file generating method may further specify a file with the first file name described in the procedure file as the original file, and may specify a file with the second file name described in the procedure file as the difference file.

This allows appropriate acquisition of the original file and difference file to be used for generation of the MP4 file.

Also, in generation of the MP4 file, MP4-conforming header information that is data included in the difference file may be combined with data included in the original file.

This allows the MP4 file that has appropriate header information of MP4 to be easily generated.

Also, in acquisition of the original file, the original file in plain text may be acquired, and in generation of the MP4 file, the generated MP4 file may be encrypted.

This allows confidentiality of data included in the original file to be secured while the data is left as the MP4 file, if the original file is deleted after conversion to MP4.

Also, in generation of the MP4 file, every time a section that constitutes the original file is acquired, a portion of the MP4 file corresponding to the section may be generated and encrypted. Every time the portion that constitutes the MP4 file is encrypted, the section of the original file corresponding to the portion may be deleted.

This makes it possible to prevent all data included in the original file in plain text from being stored even temporarily in a storage area, and allows confidentiality of the data to be secured more certainly.

Hereinafter, an exemplary embodiment will be specifically described with reference to the drawings.

Note that all exemplary embodiment to be described below illustrates comprehensive or specific examples. Numerical values, shapes, materials, components, arrangement positions and connection forms of the components, steps, order of the steps, and the like indicated in the following exemplary embodiment are one example, and do not intend to limit the present disclosure. Also, among the components described in the following exemplary embodiment, components that are not described in an independent claim which represents the highest concept are described as optional components.

Exemplary Embodiment

FIG. 5 is a block diagram illustrating a configuration of a file generating apparatus according to the present exemplary embodiment.

File generating apparatus 10 according to the present exemplary embodiment is an apparatus that generates an MP4 file, and includes original file acquisition unit 11, difference file acquisition unit 12, procedure file acquisition unit 13, and generation unit 14. Original file acquisition unit 11 acquires an original file that is made in a file format different from MP4. Difference file acquisition unit 12 acquires a difference file including data that is not included in the original file. Procedure file acquisition unit 13 acquires a procedure file that indicates a procedure for generating the MP4 file. Generation unit 14 generates the MP4 file through combination of the data included in the difference file and data included in the original file in accordance with the procedure indicated in the procedure file. In other words, generation unit 14 converts the original file into the MP4 file.

Hereinafter, a processing operation performed by this file generating apparatus 10 will be described in detail.

Figure 6:
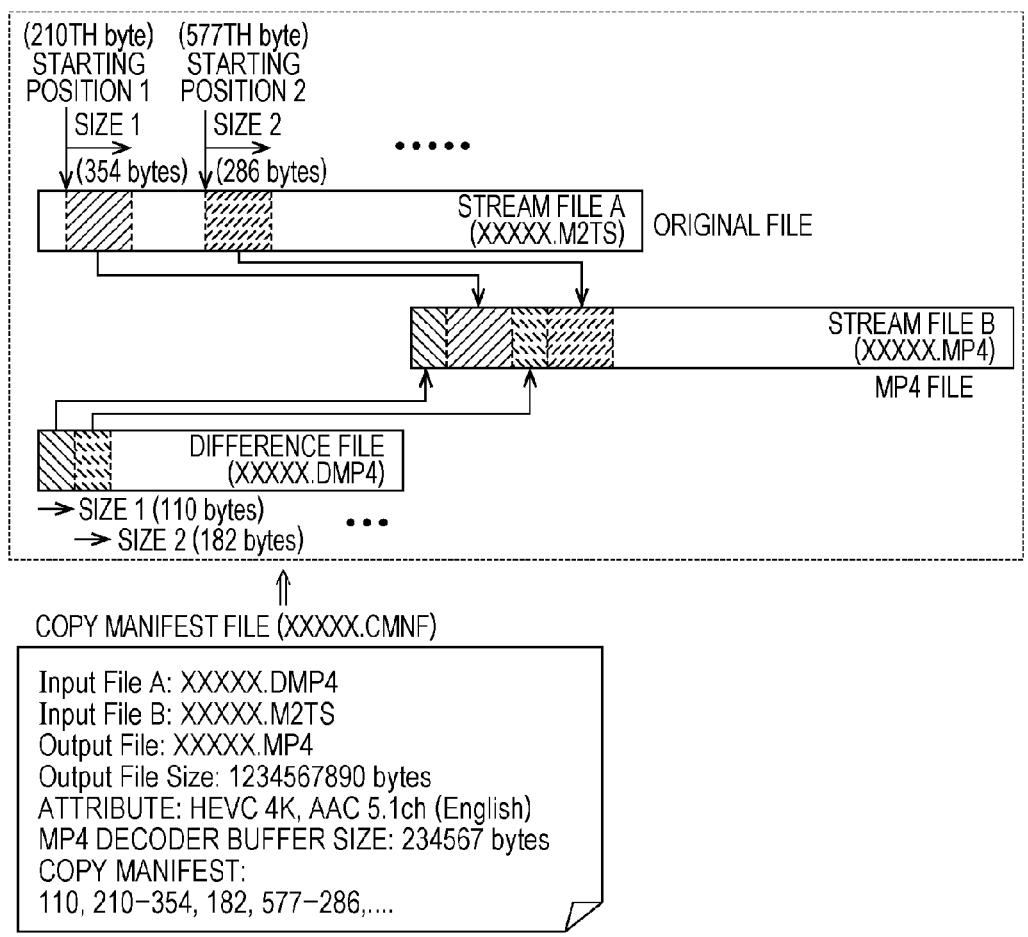
FIG. 6 is a diagram for describing a method for generating a stream file of MP4 from a stream file of MPEG2-TS, difference file, and copy manifest file according to the exemplary embodiment.

FIG. 6 is a diagram for describing a method for generating a stream file of MP4 from a stream file of MPEG2-TS, a difference file, and a copy manifest file.

According to the present exemplary embodiment, a stream file A (XXXXX.M2TS), which is the above original file, a copy manifest file (XXXXX.CMNF), which is the above procedure file, and the above difference file (XXXXX.DMP4) are recorded, for example, in an optical disc (for example, Blu-ray (registered trademark) disc). The copy manifest file (XXXXX.CMNF) describes a conversion procedure about how to process and convert this original file into the MP4 file. The difference file (XXXXX.DMP4) stores data required for conversion into the MP4 file.

When converting the stream file A of MPEG2-TS (XXXXX.M2TS), generation unit 14 alternately combines data of the stream file A (XXXXX.M2TS) and data of the difference file (XXXXX.DMP4) in accordance with description of the copy manifest file (XXXXX.CMNF) to generate a stream file B (XX XXX.MP4), which is the MP4 file. In other words, generation unit 14 converts the stream file A (XXXXX.M2TS) into the stream file B (XXXXX.MP4).

This allows conversion of the original file without restoring the original file to an elementary stream of voice or video (for example, stream of HE-AAC or MPEG-4 AVC). Also, when the original file has been encrypted, the original file may be converted into the MP4 file easily without decryption.

This copy manifest file (XXXXX.CMNF) includes "Input File A", "Input File B", "Output File", "Output File Size", "ATTRIBUTE", "MP4 DECODER BUFFER SIZE", and "COPY MANIFEST". "Input File A" and "Input File B" respectively denote file names of two files to be input. Conversion processing starts with copy of a top section of the file denoted by "Input File A". "Output File" denotes a file to be output, that is, a file name of the MP4 file to be generated. "Output File Size" denotes a data size of the MP4 file to be output. This data size is described to a precision of one byte. Checking this data size allows confirmation before conversion processing whether a medium that records the MP4 file to be output has sufficient free space. "ATTRIBUTE" denotes an attribute of each file, and specifically denotes what kind of elementary stream is converted and what kind of file is generated. In the example illustrated in FIG. 6, "ATTRIBUTE" denotes that the MP4 file after conversion includes a 4K video compressed by HEVC (High Efficiency Video Coding), and 5.1 ch English voice of AAC (Advanced Audio Coding). This allows previous confirmation before conversion processing what kind of file will be obtained after conversion when the file is converted in accordance with this copy manifest file. Also, "ATTRIBUTE" may denote information such as data structure of the MP4 file, and may denote a brand (that is, a type) of MP4 to be stored in "ftyp" of the MP4 file.

Also, "MP4 DECODER BUFFER SIZE" denotes a buffer size that is a minimum requirement for playing the stream file B after conversion (XXXXX.MP4), which is the MP4 file to be output. This buffer size is an amount depending on under what kind of multiplexing rule a video, voice, etc. are multiplexed in the MP4 file, which is the stream file B after conversion. "MP4 DECODER BUFFER SIZE" may denote what kind of decoder resource (memory capacity and data transfer rate) is required for playing the stream file B after conversion, in addition to the buffer size.

"COPY MANIFEST" denotes a range of each section of the file denoted by "Input File A" and a range of each section of the file denoted by "Input File B". Each of these sections is a section that is sequentially copied and pasted for generating the MP4 file denoted by "Output File". Also, the range of each section is denoted by a copy starting position and a copy size, or by only the copy size. Also, in order to cause the section of the file denoted by "Input File A" and the section of the file denoted by "Input File B" to be copied and pasted repeatedly and alternately, "COPY MANIFEST" denotes the range of each section of those files.

Each section of the specified size of the difference file (XXXXX.DMP4) is copied and pasted from top of the difference file. Therefore, "COPY MANIFEST" does not need to specify the copy starting position to indicate each section of the difference file (XXXXX.DMP4). That is, the range of each section of the difference file is indicated by only the copy size (data size) without using the copy starting position.

On the other hand, the stream file A (XXXXX.M2TS) includes data unnecessary for the stream file B after conversion (XXXXX.MP4). Therefore, in order to indicate each section of the stream file A that is the original file, "COPY MANIFEST" indicates the range of each section with the copy starting position and the copy size. The copy starting position is a byte position from top of the file, and the copy size is a data size in byte unit.

Generation unit 14 repeats an alternate copy and paste of a section included in the original file and a section included in the difference file indicated by "COPY MANIFEST", in accordance with the copy manifest file. That is, generation unit 14 repeats alternate combination of the section included in the original file and the section included in the difference file, indicated by "COPY MANIFEST". Accordingly, the MP4 file that is the stream file B after conversion is generated.

Therefore, in accordance with the copy manifest file, conversion of the original file performed by any device enables generation of the identical stream file B after conversion (XXXXX.MP4). That is, this facilitates playback of the stream file B after conversion by any device without any problem.

Note that file generating apparatus 10 may acquire the difference file (XXXXX.DMP4) and the copy manifest file (XXXXX.CMNF) from an optical disc, such as a Blu-ray (registered trademark) disc, and may acquire both of or one of these files via the Internet. In this case, it is possible to present various options to a user, such as converting the original file into a file in the latest file format or into an MP4 file including another video and voice, without any special change required in file generating apparatus 10.

Also, file generating apparatus 10 may perform conversion with the stream file A, which is the original file, being encrypted, or may perform conversion into the MP4 file after decryption of the original file, and encrypt the generated MP4 file again. Also, the file stream (XXXX X.M2TS), which is the original file, may be plain text. Note that since the difference file includes header information, encryption of the difference file is unnecessary. However, when the stream file A (XXXXX.M2TS), which is the original file, or the stream file B (XXXXX.MP4), which is the MP4 file, is plain text, an operation of developing the entire file in a memory, or retaining the entire file temporarily in a hard disk may not be allowed from a security viewpoint.

Therefore, in order from a region in which conversion to the MP4 file has finished, file generating apparatus 10 may delete the region, out of the stream file A (XXXXX.M2TS), which is the original file in plain text. Also, when encrypting the stream file B (XXXXXX.MP4), which is the MP4 file, every time "Movie fragment" included in the MP4 file or a section such as a predetermined number of MP4 samples is generated, file generating apparatus 10 may encrypt the generated section sequentially. Note that when an encryption scheme is used under which the data size does not change before and after the encryption, the data region to be copied does not change regardless of whether the data is encrypted.

Also, the copy manifest file may indicate whether the stream file A (XXXXX.M2TS), which is the original file, has been encrypted. Alternatively, the copy manifest file may indicate whether to convert the stream file A with the multiplexed coded data being encrypted, or whether to decrypt the encrypted coded data into plain text, to convert the data into an MP4 file, and then to encrypt the MP4 file again.

Figure 7:
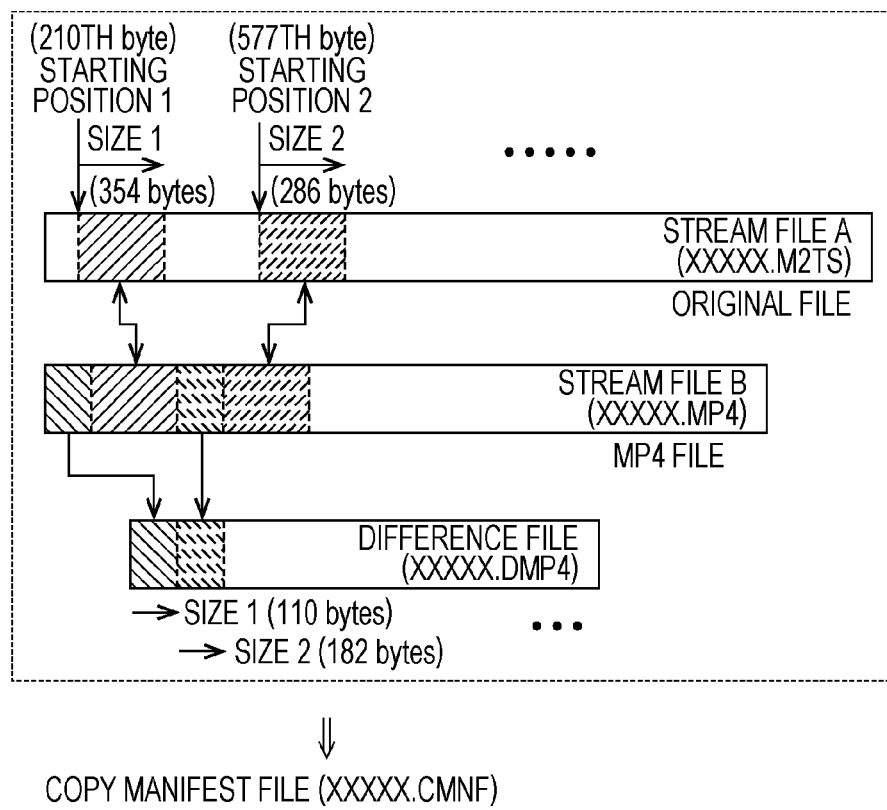
FIG. 7 is a diagram for describing a method for generating a difference file and copy manifest file according to the exemplary embodiment.

FIG. 7 is a diagram for describing a method for generating the difference file and the copy manifest file.

The difference file (XXXXX.DMP4) and the copy manifest file (XXXXX.CMNF) may be generated as follows. In an authoring stage, format conversion is performed on the stream file A (XXXXX.M2TS), which is the original file, to generate the stream file B after conversion (XXXXX.MP4), which is the MP4 file. Next, at least one section is searched for, including data that coincides with each other between the stream file A, which is the original file, and the stream file B. At this time, the search is performed so that the data size of each section may be maximized. Next, the difference file is generated by connecting each of the remaining sections other than the section searched for as described above included in the stream file B in order included in the stream file B. A correlation result of each file at this time is recorded in the copy manifest file as "COPY MANIFEST".

Note that the above-described search is performed through sequential acquisition of data included in each of the stream file A and the stream file B in a backward direction from top of each file, and through comparison of those pieces of data. This comparison is performed without returning in a direction opposite to the above-described direction. This allows the above-described conversion processing (copy processing) to be performed sequentially, that is by one continuous process, and allows achievement of high speed or small memory.

Note that when a video and audio are multiplexed by MPEG2-TS, in order to prevent underflow of data of a picture with a large amount of codes, such as I picture, a picture of predetermined PTS (Presentation Time Stamp) included in the video may be multiplexed earlier in time, compared with a frame of PTS identical to the predetermined PTS included in audio. On the other hand, when a video and audio are multiplexed by MP4, it is common that the multiplexing is performed so that PTS of the top picture of the video and PTS of the top frame of the audio in "Movie fragment" may coincide with each other or may be in proximity.

Thus, if a multiplexing unit of audio, video, or text differs between the stream file A and the stream file B, conversion processing may not be performed sequentially. As a result, conversion may be performed while a pointer for reading or writing is moved forward and backward sequentially. Therefore, information such as whether conversion processing may be performed by one continuous process, and a maximum data size for required backtracking when conversion processing cannot be performed by one continuous process may be registered in the copy manifest file.

Note that if a search to be performed of the stream file A and the stream file B for a section including coincident data is performed in a small unit of data, the data size of the copy manifest file becomes large, or conversion processing becomes complicated. For this reason, a specific threshold may be provided. For example, only a section including data of which eight bytes or more coincide with each other is registered in the copy manifest file. Even if each of the remaining sections other than the above section included in the stream file B includes data that coincides with data of the stream file A, the data being shorter than 8 bytes, the data included in those remaining sections is stored in the difference file. Also, this threshold may be described as "MIN COPY SIZE: 8 bytes" in the copy manifest file.

Also, a file of MPEG-2 TS may be converted into an MP4 file by using the copy manifest file that indicates a multiplexing unit in the MP4 file, without using the difference file. In MP4, for example, audio, video, and text are multiplexed as "Movie fragment" that differs from one another. At this time, information such as DTS of each of an audio frame and video picture that are top and end of "Movie fragment" in order of decryption, and a byte offset value from top of a file of MPEG-2 TS may be registered together with identification information about the medium. It is assumed here that order of registration of "Movie fragment" coincides with order of appearance of "Movie fragment" in the MP4 file.

Figure 8:
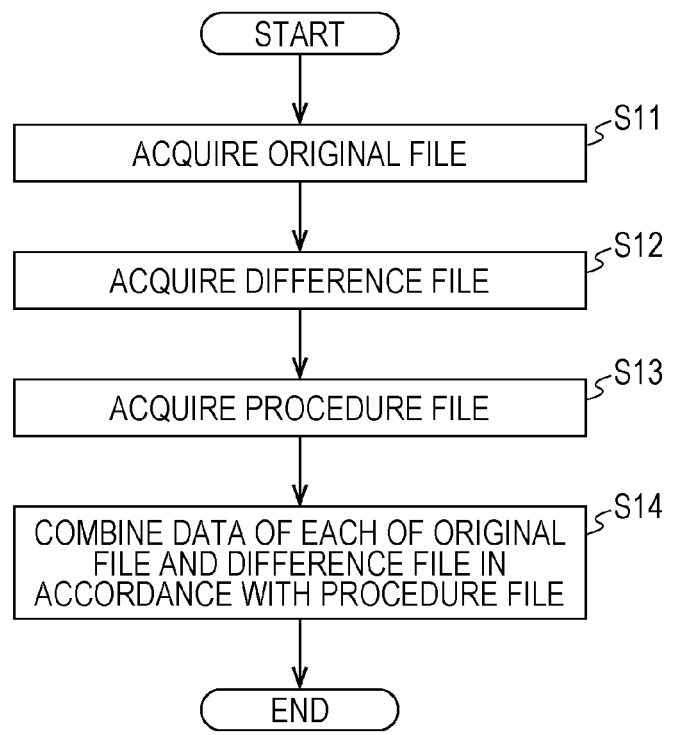
FIG. 8 is a flowchart of a file generating method according to the exemplary embodiment.

FIG. 8 is a flowchart of a file generating method according to the present exemplary embodiment.

The file generating method according to the present exemplary embodiment is a method by which file generating apparatus 10 generates the MP4 file. In this file generating method, first, original file acquisition unit 11 of file generating apparatus 10 acquires the original file that is made in the file format different from MP4 (step S11). Next, difference file acquisition unit 12 acquires the difference file including data that is not included in the original file (step S12). Next, procedure file acquisition unit 13 acquires the procedure file that indicates the procedure for generating the MP4 file (step S13). Then, in accordance with the procedure indicated in the procedure file, generation unit 14 combines the data included in the difference file and data included in the original file to generate the above-described MP4 file (step S14). For example, in step S11, original file acquisition unit 11 acquires the original file that is made in the file format of MPEG2-TS.

Accordingly, in accordance with the predetermined procedure, the MP4 file is generated through combination of the data included in the difference file and the data included in the original file. Therefore, the MP4 file can be easily generated without restoring the original file made in the file format such as MPEG2-TS to each stream such as the video stream and the voice stream. Also, even if the original file has been encrypted, it is not necessary to decrypt and re-encrypt the original file. Therefore, a processing load for generating the MP4 file may be reduced.

Also, in steps S11 to S13, original file acquisition unit 11, difference file acquisition unit 12, and procedure file acquisition unit 13 read the original file, difference file, and procedure file from the optical disc, respectively, to acquire those files. This allows all the files required for generation of the MP4 file to be acquired from one optical disc, and thus saves time and effort for searching for those files, and allows the MP4 file to be generated more easily.

Here, the procedure file describes ranges of a plurality of respective sections included in the difference file, and ranges of a plurality of respective sections included in the original file, so that the ranges of the sections included in the difference file and the ranges of the sections included in the original file may be arranged alternately. Therefore, in step S14, generation unit 14 combines the sections indicated by the respective ranges in order of the respective ranges described in the procedure file to generate the MP4 file. This allows each section included in the MP4 file to be generated in order from top of the MP4 file, and since the processing does not go backward, the MP4 file can be generated more easily.

Also, the ranges of the plurality of respective sections included in the difference file are described in the procedure file in data size. On the other hand, the ranges of the plurality of respective sections included in the original file are described in the procedure file in starting position and data size of the section. This allows appropriate sections to be copied or acquired from the difference file and the original file, and to be combined in accordance with description in the procedure file. Also, since the starting position is not used for description of the range of the section included in the difference file, the data size of the procedure file may be reduced.

Also, the data size of the MP4 file is described in the procedure file. Therefore, in step S14, generation unit 14 may further determine whether the medium has free space for recording the MP4 file based on the data size of the MP4 file described in the procedure file. Since this determines whether the medium has free space for recording the MP4 file, if the medium does not have enough free space, processing such as stopping generation of the MP4 file in advance can be performed. That is, occurrence of errors can be prevented.

Also, the attribute of the MP4 file is described in the procedure file. Therefore, file generating apparatus 10 may further read the attribute described in the procedure file. This allows previous determination to be made whether the desired MP4 file will be generated, if the attribute of the MP4 file is read from the procedure file before generation of the MP4 file.

Also, the buffer size required for playback of the MP4 file is described in the procedure file. Therefore, file generating apparatus 10 may further read the buffer size described in the procedure file. This allows determination to be made easily whether the MP4 file can be played without analysis of the MP4 file, if the buffer size required for playback of the MP4 file is read from the procedure file.

Also, a first file name, which is a name of the original file, and a second file name, which is a name of the difference file, are described in the procedure file. Therefore, file generating apparatus 10 may further specify a file with the first file name described in the procedure file as the original file, and may specify a file with the second file name described in the procedure file as the difference file. This allows appropriate acquisition of the original file and difference file to be used for generation of the MP4 file.

Also, in step S14, generation unit 14 combines MP4-conforming header information that is data included in the difference file with data included in the original file. This allows the MP4 file that has appropriate header information of MP4 to be easily generated.

Also, in step S11, original file acquisition unit 11 may acquire the original file in plain text, and in step S14, generation unit 14 may encrypt the generated MP4 file. This allows confidentiality of data included in the original file to be secured while leaving the data as the MP4 file, if the original file is deleted after conversion to MP4.

Here, in step S14, every time a section that constitutes the original file is acquired, generation unit 14 may generate and encrypt a portion of the MP4 file corresponding to the section, and every time the portion that constitutes the MP4 file is encrypted, generation unit 14 may delete the section of the original file corresponding to the portion. This makes it possible to prevent all data included in the original file in plain text from being stored even temporarily in a storage area, and allows confidentiality of the data to be secured more certainly.

Variation 1

Although the above-described exemplary embodiment uses the difference file and the copy manifest file to generate the MP4 file, the MP4 file may be generated without using these files. In a file generating method according to the present variation, a counter is used to convert a stream file of MPEG2-TS made of a plurality of Source Packets, each of which has a header in plain text, into a stream file of MP4. This causes the stream file of MP4 to be generated. Note that the stream file of MPEG2-TS is the original file, and the stream file of MP4 is the MP4 file.

FIG. 9 is a diagram for describing the file generating method according to the present variation.

The stream file (that is, content) of MPEG2-TS includes the plurality of Source Packets, as described above. Note that each of the Source Packets is abbreviated as SP in FIG. 9.

In each Source Packet included in the stream file of MPEG2-TS in the present variation, only a TS Payload section of data included in the Source Packet is encrypted. That is, of the data included in the Source Packet, TS_extra_header and TS Header are not encrypted but are plain text.

An AES-CTR (CounTeR) mode is used for encryption. Note that in the AES-CTR mode, encryption and decryption using a value of the counter are performed. As illustrated in FIG. 9, the value of the counter for video (AES Counter for Video) is used to encrypt the plurality of TS Payloads each including data of video. The value of the counter for audio (AES Counter for Audio) is used to encrypt the plurality of TS Payloads each including data of audio. The counter for video counts only data of the Source Packet of video so that the count value may increase in accordance with an arrow illustrated in FIG. 9. The counter for audio counts only data of the Source Packet of audio so that the count value may increase in accordance with an arrow illustrated in FIG. 9. Note that details of encryption in the AES-CTR mode will be described later.

A file generating apparatus can convert the stream file of MPEG2-TS into the stream file of MP4 easily by extracting only the TS Payload from each of the plurality of Source Packets included in the stream file of MPEG2-TS.

Figure 10A:
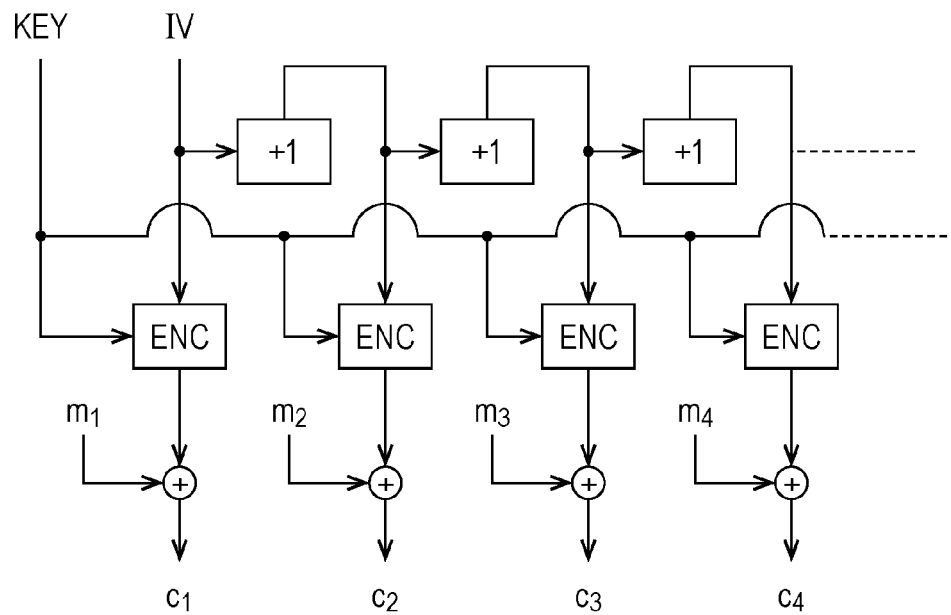
FIG. 10A is a diagram for describing encryption of data in an AES-CTR mode according to variation 1 of the exemplary embodiment.

FIG. 10A is a diagram for describing encryption of data by the AES-CTR mode.

In encryption, a key and IV (Initial Vector), which is an initial value, are used. First, the key is used to encrypt IV. Calculation of exclusive OR between this value resulting from encryption and top 16 bytes of data to be encrypted (m1 illustrated in FIG. 10A) generates ciphertext c1 corresponding to the top 16 bytes. Data (block) of next 16 bytes (m2 illustrated in FIG. 10A) included in the data to be encrypted undergoes processing identical to the above-mentioned processing performed on the top 16 bytes after IV is updated, like IV=IV+1. This causes ciphertext c2 corresponding to the next 16-byte data to be generated. The IV updated as described above is the above counter value. The counter for video and the counter for audio illustrated in FIG. 9 each calculate IV=IV+1.

Performing such processing continuously allows the ciphertext to be created even for long data of 16 bytes or more. Note that when a length of the data to be encrypted is not a multiple of 16 bytes, performing exclusive OR on a bit-by-bit basis in a tail block generates the ciphertext.

Figure 10B:
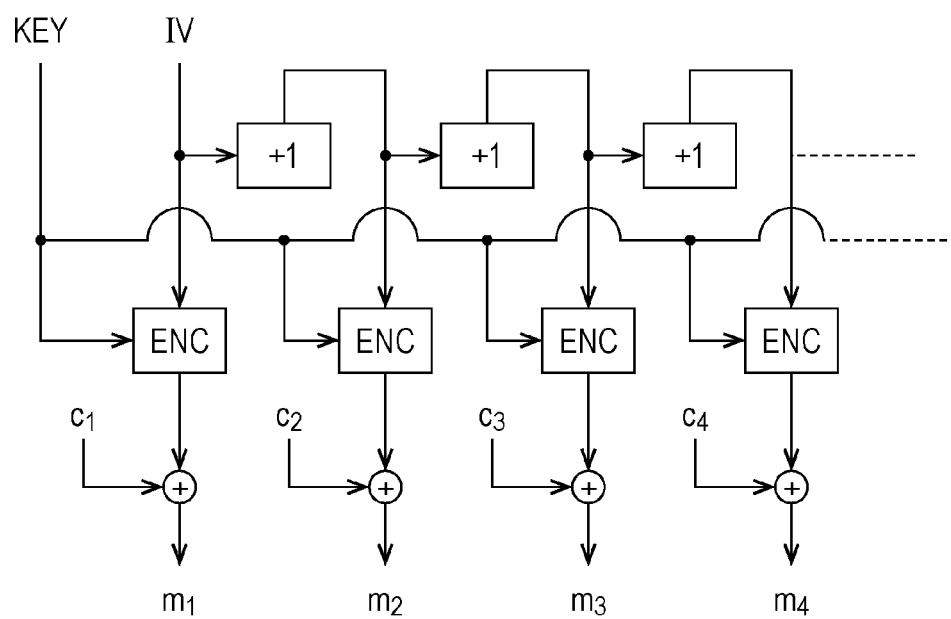
FIG. 10B is a diagram for describing decryption of data in the AES-CTR mode according to variation 1 of the exemplary embodiment.

FIG. 10B is a diagram for describing decryption of data by the AES-CTR mode.

In decryption, processing completely identical to processing of encryption is performed on data to be decrypted. That is, processing for encrypting IV by using the key is performed also in decryption.

Thus, the file generating method according to the present variation is a file generating method for generating the MP4 file. The file generating method acquires the original file made of a plurality of packets, acquires only a remaining encrypted payload section of the packet excluding header information in plain text for each packet included in the original file, and generates the MP4 file through combination of the payload section. For example, in acquisition of the original file, the original file made in the file format of MPEG2-TS is acquired. This allows the MP4 file to be easily generated, without restoring the original file formed in a file format such as MPEG2-TS to each stream such as a video stream and a voice stream. Also, it is not necessary to decrypt and re-encrypt the original file. Therefore, a processing load for generating the MP4 file may be reduced.

Here, among the plurality of packets included in the original file, the payload of each of the plurality of packets including data of video is encrypted using a counter value of a first counter for video. The payload of each of the plurality of packets including data of audio is encrypted using a counter value of a second counter for audio different from the first counter. The first counter counts only data included in each of the plurality of packets corresponding to video, backward from top of the original file. The second counter counts only data included in each of the plurality of packets corresponding to audio, backward from top of the original file. Accordingly, since the first counter is used as a counter dedicated to video, in the MP4 file, it is possible to easily decrypt a video elementary that is formed through combination of the payload of each of the plurality of packets corresponding to video. Similarly, since the second counter is used as a counter dedicated to audio, in the MP4 file, it is possible to easily decrypt an audio elementary that is formed through combination of the payload of each of the plurality of packets corresponding to audio.

Note that the original file includes a plurality of Aligned Units, and each of the plurality of Aligned Units includes the plurality of Source Packets. The plurality of packets included in the original file is the plurality of Source Packets included in each of the plurality of Aligned Units. Also, the payload is the TS Payload, and the header information is made of TP_extra_header and TS Header.

Variation 2

Although the above-described exemplary embodiment uses the difference file and the copy manifest file to generate the MP4 file, the MP4 file may be generated without using these files. A file generating method according to the present variation converts the stream file of MPEG2-TS including supplementary information into the stream file of MP4 by using the supplementary information. This causes the stream file of MP4 to be generated.

Since part of a data multiplexing method of an access unit differs between MPEG2-TS and MP4, when storing data of MPEG2-TS in the MP4 file, it is necessary to separate the access unit into a plurality of sections and to store those sections separately. Basically, the access unit in MPEG2-TS includes both initialization information required for decryption of a picture of video or a frame of audio, and coded data of a picture or a frame. On the other hand, the access unit in the MP4 file (referred to as a sample or MP4 sample in MP4) includes only coded data of a picture or a frame. The initialization information required for decryption is stored separately from the coded data as header information of the MP4 file.

Hereinafter, description will be provided about supplementary information for reducing an amount of processing required for conversion of the coded data multiplexed by MPEG2-TS into an MP4 file, and about a conversion method of a multiplexed format by using the supplementary information. In particular, when the coded data is encrypted, an amount of processing for decryption and re-encryption is large. The present variation enables conversion to an MP4 file only by copy of data, without decryption of the coded data.

Note that the stream file of MPEG2-TS, which is the original file before conversion, may be another TS (transport stream). That is, the original file is not only TS specified by an MPEG-2 system, but also may be TS obtained by appending header information with a predetermined number of bytes to a TS packet (for example, TS used in a Blu-ray (registered trademark) disc or video distribution). Also, the MP4 file generated by conversion may be an MP4 file that uses "Movie fragment", and may be an MP4 file that does not use "Movie fragment". Furthermore, the format of the file generated by conversion may be a format such as CFF (Common File Format) of DECE (Digital Entertainment Content Ecosystem) extended based on MP4, or MPEG-DASH (Dynamic Adaptive Streaming over HTTP). The following description assumes that the original file is the transport stream.

Figure 11:
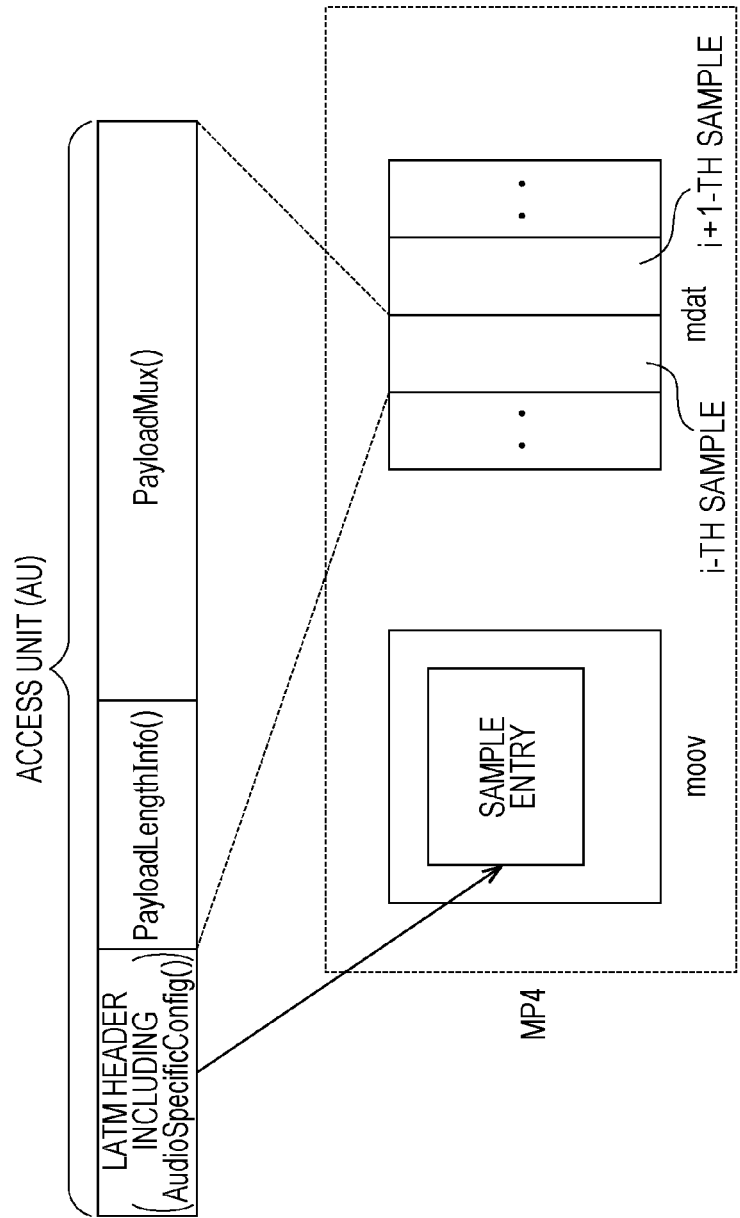
FIG. 11 is a diagram illustrating an example of storing in an MP4 file an access unit of MPEG-4 AAC stored in a transport stream according to variation 2 of the exemplary embodiment.

FIG. 11 is a diagram illustrating an example of storing in the MP4 file the access unit of MPEG-4 AAC stored in the transport stream.

The access unit of MPEG-4 AAC in the transport stream includes three types of data: LATM (Low Overhead Audio Transport Multiplex) header, PayloadLengthInfo( ), and PayloadMux( ). The LATM header includes initialization information required for decryption of coded data of MPEG-4 AAC, such as a number of channels and a sampling frequency (also referred to as AAC data). More particularly, the initialization information is stored in AudioSpecificConfig( ) in the LATM header. A size of PayloadMux( ) is stored in PayloadLengthInfo( ), and AAC data is stored in PayloadMux( ).

When the data of the access unit is stored in the MP4 file, AudioSpecificConfig( ) in the LATM header is stored in a sample entry in stsd within moov of the MP4 file. Furthermore, PayloadLengthInfo( ) and PayloadMux( ) are stored in mdat as sample data. Note that the sample data is data to be stored in the sample. Also, the sample data within mdat is referred to from moov, or, when "Movie fragment" is used, the sample data within mdat is referred to from moof. In MPEG-2 AAC, not the LATM header but an ADTS (Audio Data Transport Stream) header is used, and the access unit includes the ADTS header and AAC data (referred to as raw_data_block( ). Also at this time, the ADTS header is separated from the access unit, and at least adts_fixed_header( ) of data included in the ADTS header is stored in the sample entry. Furthermore, the AAC data is stored in mdat as sample data.

Figure 12:
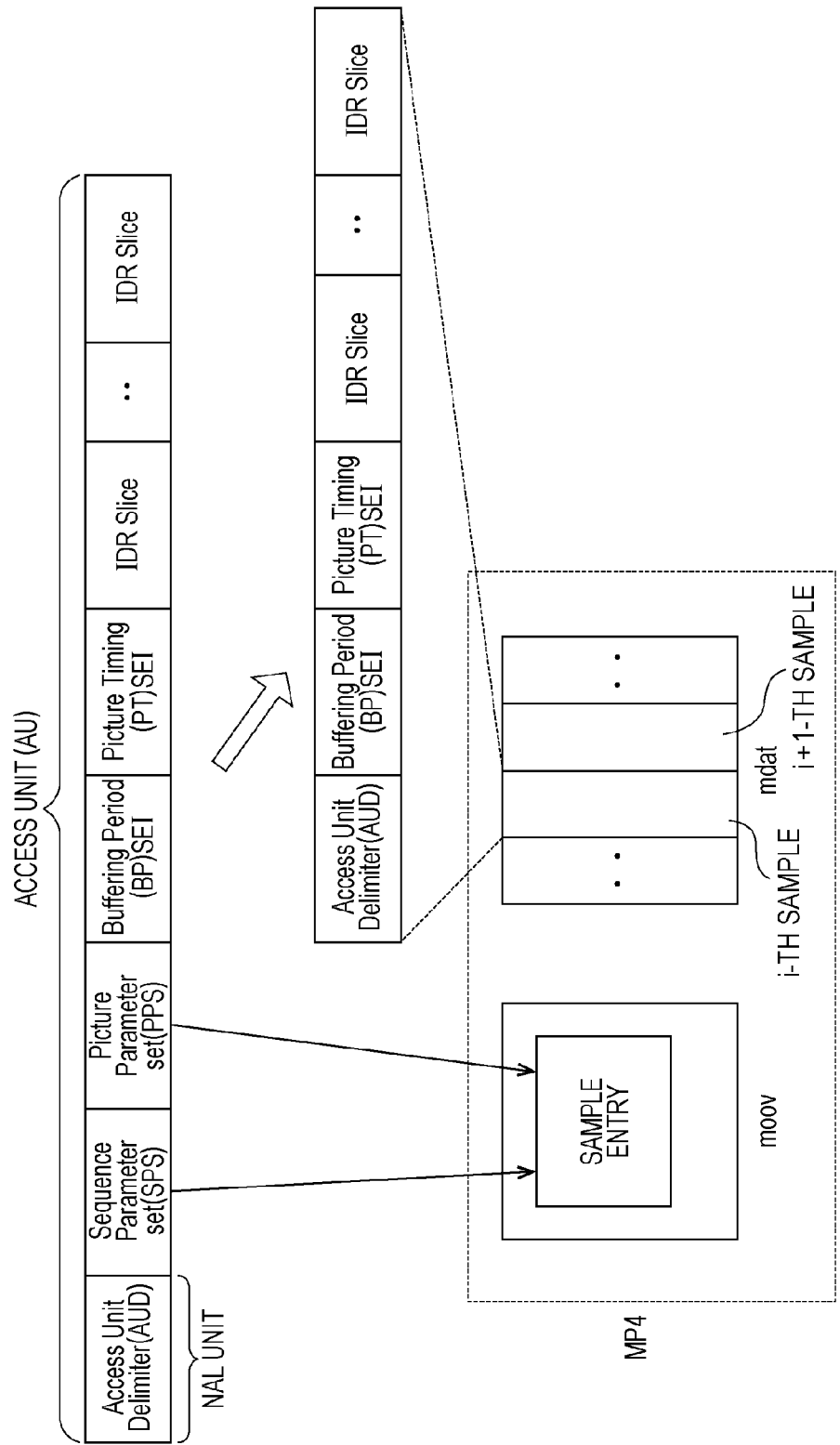
FIG. 12 is a diagram illustrating an example of storing in an MP4 file an access unit of MPEG-4 AVC stored in a transport stream according to variation 2 of the exemplary embodiment.

FIG. 12 is a diagram illustrating an example of storing in MP4 the access unit of MPEG-4 AVC (Advanced Video Coding) stored in the transport stream.

As is the case with MPEG-4 AAC, in the transport stream, initialization information required for decryption, such as Sequence Parameter Set (SPS) and Picture Parameter Set (PPS), is stored as part of the access unit. On the other hand, in the MP4 file, these pieces of initialization information are stored as header information of the MP4 file. The access unit illustrated in FIG. 12 constitutes an IDR (Instantaneous Decoder Refresh) picture. An NAL (Network Adaptation Layer) unit of each of SPS and PPS is separated from the access unit and is stored in the sample entry in stsd within moov of the MP4 file. Other data included in the access unit is stored in mdat as sample data.

Note that in MP4, a mode that allows the sample data of MPEG-4 AVC to include the initialization information such as SPS and PPS can be selected. The mode is indicated by the identification information on the sample entry. When the identification information is "avc1" or "avc2", it is prohibited to include the initialization information in the sample data. On the other hand, when the identification information is "avc3" or "avc4", it is allowed to include the initialization information in the sample data. Therefore, in conversion of the transport stream into the MP4 file, when the above-described identification information in the MP4 file is set to "avc1" or "avc2", the NAL unit of SPS and PPS, or the NAL unit of FillerData used for stuffing is deleted from the data stored in mdat from the access unit in the transport stream. Also, when the identification information is set to "avc3" or "avc4", it is not necessary to delete the NAL unit of SPS or PPS. Therefore, whether to delete SPS and PPS may be switched in accordance with a setting value of the identification information in the MP4 file.

Also, data of HEVC (High Efficiency Video Coding), which is a next-generation video coding scheme, is made of the NAL unit in a similar manner to MPEG-4 AVC, and includes the initialization information such as SPS and PPS. When the data of HEVC is stored in the MP4 file, the initialization information may be included in the sample data. Therefore, when the transport stream is converted into the MP4 file, of data to be stored in mdat from the access unit in the transport stream, whether to delete the initialization information may be determined in accordance with a type of the coding scheme, and processing may be performed in accordance with a result of the determination.

As described above, when the coded data of MPEG-4 AAC is stored in the MP4 file, the LATM header is separated from the access unit. Furthermore, only PayloadLengthInfo( ) and PayloadMux( ) are stored in mdat as sample data. Hereinafter, PayloadLengthInfo( ) and PayloadMux( ) are together referred to as LATM payload.

Therefore, in the present variation, when data of the access unit of MPEG-4 AAC is stored in the plurality of TS packets, the LATM header and LATM payload are stored in separate TS packets. This allows the LATM header to be easily separated.

Figure 13:
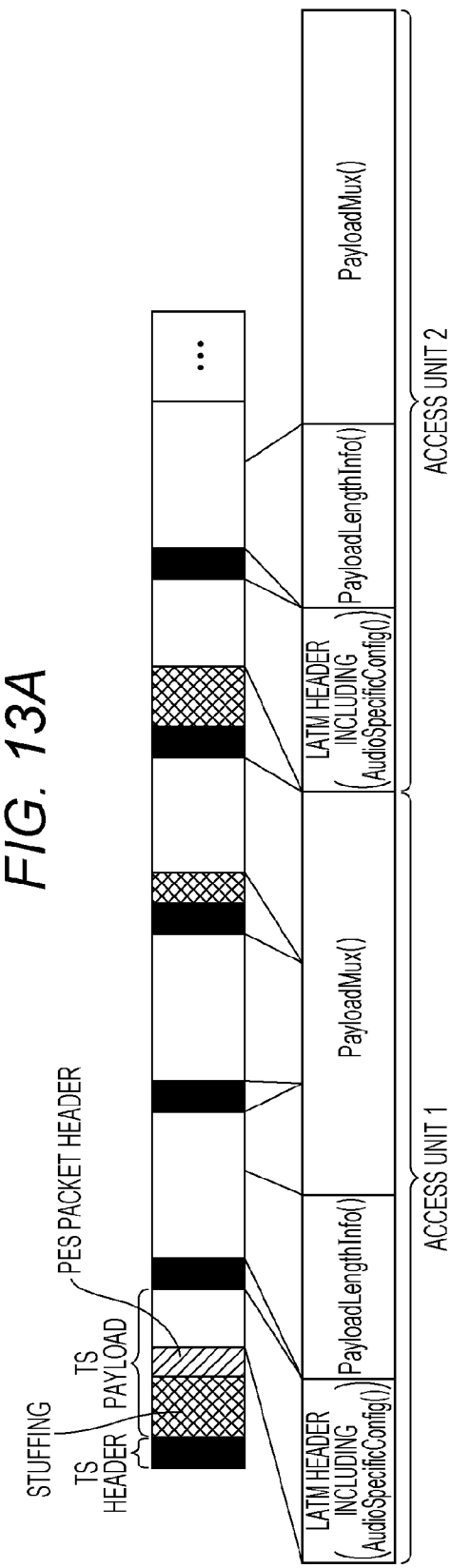
FIG. 13A is a diagram illustrating an example of storage of an LATM header and an LATM payload in a TS packet according to variation 2 of the exemplary embodiment.
FIG. 13B is a diagram illustrating an example of syntax of an AU_info table according to variation 2 of the exemplary embodiment.
FIG. 13C is a diagram illustrating another examples of syntax of the AU_info table according to variation 2 of the exemplary embodiment.

FIG. 13A is a diagram illustrating an example of storage of the LATM header and the LATM payload in the TS packet. Stuffing is performed as necessary so that data of the LATM header and data of the LATM payload may not be intermingled within the payload of the identical TS packet. For example, the LATM header of access unit 1 is stored in the payload of the top TS packet. At this time, when the size of the LATM header is less than the size of the TS payload, stuffing is performed to a remaining region of the TS payload. Note that, although the PES packet is not described in the example illustrated in FIG. 13A, actually, data of the access unit is stored in the payload of the PES packet, and data of the PES packet is stored in the payload of the TS packet.

Next, a method will be described for identifying the TS packet in which the LATM header is stored and the TS packet in which the LATM payload is stored. When one access unit is stored as one PES packet, payload_unit_start_indicator of the TS header is set to 1 in the TS packet including the top data of the PES packet. If it is guaranteed that the LATM header is included in the payload of the TS packet in which payload_unit_start_indicator is set to 1, it is possible to determine whether the LATM header is included within the TS packet, based on a value of payload_unit_start_indicator. When a plurality of access units is stored in one PES packet, the AU_info table, which is supplementary information, may be arranged at top of the payload of the PES packet. This AU_info table includes a number of access units included in the payload of the PES packet, and sizes of the LATM header and the LATM payload in each access unit.

FIG. 13B is a diagram illustrating an example of syntax of the AU_info table.

The AU_info table includes AU_info_identification_code, number of AU that denotes the number of access units, and size_of LengthInfo that denotes the sizes of the LATM header and the LATM payload in the access unit. AU_info_identification_code is a bit string unique to the AU_info table. It is possible to determine whether the AU_info table exists by searching for this code. Alternatively, as in Box structure of MP4, the AU_info table may have data structure that combines a data size of Box with a type of Box. However, when existence of the AU_info table is signaled by information such as a descriptor in the transport stream, or supplementary data for conversion to the MP4 file prepared separately from the transport stream, the code described above may be omitted. Also, when one access unit is stored in one PES packet, the AU_info table may be used.

By indicating such size or data offset of each component in the access unit, a technique for specifying data to be separated for conversion to the MP4 file may be applied to coded data of MPEG-4 AVC. That is, when the coded data of MPEG-4 AVC is stored in the MP4 file, the technique described above may be applied in order to separate the NAL unit of each of SPS and PPS.

FIG. 13C is a diagram illustrating an example of syntax of the AU_info table for indicating whether it is necessary to exclude a component from sample data of the MP4 file for each component in the access unit.

The AU_info table includes AU_info_identification_code, number_of_data_unit, size_of_data_unit, and conversion_mode. number_of_data_unit denotes a number of data units included in the access unit. size_of_data_unit denotes a size of the data unit. conversion_mode is a conversion mode that indicates how to handle the data unit at a time of conversion to the MP4 file. If conversion_mode is 0, the conversion_mode indicates to copy the data unit as sample data of the MP4 file. Also, if conversion_mode is 1, the conversion_mode indicates to exclude the data unit from the sample data, that is, not to copy the data unit as the sample data.

Note that when conversion_mode is 1, the conversion_mode may indicate handling of the data unit after excluding the data unit. For example, the conversion_mode indicates information such as storing the data unit in the sample entry after excluding the data unit from the sample data.

Also, information on each of the plurality of data units is stored in ascending order of decryption. For example, when one access unit of MPEG-4 AVC is stored as one PES packet, the data unit corresponds to the NAL unit, and a number of NAL units that constitute the access unit is indicated by num_of_data_unit. Then, conversion_mode is set to 1 for the NAL unit of each of SPS and PPS. Also, each of the LATM header and the LATM payload may be regarded as the data unit. In this case, this AU_info table can be applied also to MPEG-4 AAC by setting conversion_mode to 1 for the data unit corresponding to the LATM header. When the plurality of access units is stored in the PES packet, number_of_data_unit denotes the total number of data units included in all the access units in the PES packet.

Note that the AU_info table may be stored in adaptation_field of the header of the TS packet including a starting section of the PES packet (TS Header of FIG. 3). The AU_info table may be stored as part of the coded data such as the NAL unit or SEI (Supplemental Enhancement Information) in MPEG-4 AVC or HEVC. When the AU_info table is stored as part of the coded data, the AU_info table may be stored for each access unit or each random access. Also when the AU_info table is stored in the TS packet or PES packet, the AU_info table may be stored for each PES packet, and the AU_info table may be stored only in the PES packet including the access unit that comes first in order of decryption in the random access unit. When the AU_info table is stored for each random access unit, information regarding all the access units that constitute the random access unit is stored in the AU_info table.

Figure 14:
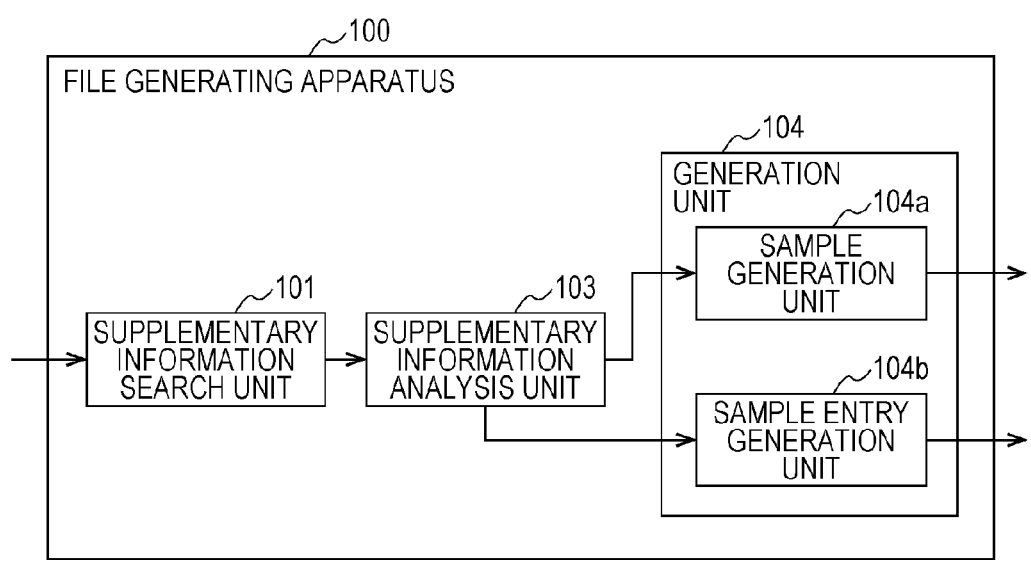
FIG. 14 is a block diagram illustrating a configuration of the file generating apparatus according to variation 2 of the exemplary embodiment.

FIG. 14 is a block diagram illustrating a configuration of the file generating apparatus according to the present variation.

File generating apparatus 100 according to the present variation converts the transport stream including the AU_info table into an MP4 file to generate the MP4 file. This file generating apparatus 100 includes supplementary information search unit 101, supplementary information analysis unit 103, and generation unit 104. Supplementary information search unit 101 searches the transport stream for the AU_info table, which is the supplementary information. Based on a result of the search, supplementary information analysis unit 103 determines whether the AU_info table exists. Furthermore, on determination that the AU_info table exists, supplementary information analysis unit 103 analyzes the AU_info table. Based on an analysis result made by supplementary information analysis unit 103, generation unit 104 generates the MP4 file.

Specifically, generation unit 104 includes sample generation unit 104a and sample entry generation unit 104b. Sample generation unit 104a stores data such as data of the LATM payload or the NAL unit other than SPS and PPS in mdat of the MP4 file as sample data. Sample entry generation unit 104b stores data such as the data of the LATM header or the NAL unit of each of SPS and PPS in the sample entry in stsd within moov of the MP4 file.

Such a file generating apparatus 100 can easily convert the transport stream including the AU_info table described above into the MP4 file.

As described above, when the coded data of audio or video is to be stored, a storage place of the initialization information required for decryption differs between MPEG2-TS and MP4. Furthermore, a storage format of the NAL unit in MPEG-4 AVC or HEVC differs between MPEG2-TS and MP4. Therefore, conversion of the storage format is needed for conversion from the transport stream to the MP4 file. Hereinafter, the storage format of the NAL unit in MPEG2-TS and MP4 will be described with reference to FIG. 15A to FIG. 15C.

FIG. 15A is a diagram illustrating schematic structure of the NAL unit.

The NAL unit includes a header and a payload. The header stores type information that indicates a type of data to be stored in the payload.

FIG. 15B is a diagram illustrating an example of the storage format of the NAL unit in MPEG2-TS. In MPEG2-TS, in order to identify a boundary of the NAL unit, a unique bit string called a start code is appended to the NAL unit as identification information (hereinafter such a form of the identification information is referred to as a start code form). An apparatus such as a decryption apparatus can separate a desired NAL unit by searching for the start code and the type information stored in the header of the NAL unit.

FIG. 15C is a diagram illustrating an example of the storage format of the NAL unit in MP4. In MP4, in order to identify the boundary of the NAL unit, a field that indicates a data size of the NAL unit as the identification information is appended to the NAL unit (hereinafter such a form of the identification information is referred to as an NAL size form). Here, a field length of the field that indicates the data size is stored in AVCDecoderConfigurationRecord in the sample entry. AVCDecoderConfigurationRecord is a region where information such as the initialization information for decryption is stored. An apparatus such as a decryption apparatus can separate the desired NAL unit based on the data size of the NAL unit.

As described above, MPEG2-TS differs from MP4 also in whether the form of the identification information indicating the boundary of the NAL unit is the start code form or the NAL size form. Therefore, when converting the transport stream into the MP4 file, it is necessary to convert the identification information that indicates the boundary of the NAL unit. Note that since the storage format of the NAL unit is specified for each coding scheme, an operation of conversion to the MP4 file may be switched with reference to the coding scheme of audio or video.

In conversion to the MP4 file, when data of the coding scheme of the NAL size form is handled, the data size of the NAL unit is required. Therefore, the data size of the NAL unit that constitutes the access unit may be preferably acquired in advance. This allows an amount of processing for determining the data size of the NAL unit to be reduced, by searching the access unit in the start code form for the start code and detecting the NAL unit boundary.

That is, size information that indicates the data size of each NAL unit included in the access unit is stored in top of the access unit in the transport stream according to the present variation.

FIG. 16A is a diagram illustrating an example of a configuration of the access unit in the transport stream according to the present variation. As illustrated in this FIG. 16A, size information that indicates the data size of each NAL unit that constitutes the access unit multiplexed in the transport stream is stored in top of the access unit. For example, this size information is stored in a newly defined size information NAL unit. The types of the NAL unit include a type for private and a type for user data. Therefore, any type is selected from these types, and the selected type of the NAL unit is used as the size information NAL unit. Since the size information does not need to be encrypted, this size information NAL unit is stored in plain text.

FIG. 16B is a diagram illustrating an example of syntax of the size information included in the size information NAL unit. The size information includes number_of_nalu and nal_size. number_of_nalu denotes a number of NAL units that constitute the access unit, and nal_size denotes the data size of each NAL unit. Since the size information NAL unit is not stored in the MP4 file, the size information does not need to indicate the data size of the size information NAL unit itself. Note that in the example illustrated in FIG. 16A, the size information NAL unit is arranged before the NAL unit for signaling top of the access unit called Access Unit Delimiter (AUD). However, the size information NAL unit may be arranged immediately after AUD. When the size information NAL unit is arranged immediately after AUD, the size information on the size information NAL unit indicates the size of each NAL unit after AUD. Therefore, the size information does not indicate the data size of AUD. However, since the data size of AUD is fixed, file generating apparatus 100 may store the data size in advance. Also, in a similar manner to the AU_info table, the size information may be arranged at top of the payload of the PES packet.

FIG. 16C is a diagram illustrating another example of syntax of the size information included in the size information NAL unit.

As illustrated in FIG. 16A, in addition to the start code, a variable-length code, such as zero_byte, may be included before the NAL unit in the transport stream. Therefore, as illustrated in FIG. 16C, the size information may store a data size (prefix_size illustrated in FIG. 16C) of the identification information including the start code of the NAL unit. Note that when the data size of the identification information is fixed, the data size of the identification information may be stored in a descriptor of MPEG2-TS or in the supplementary data for conversion to the MP4 file. Furthermore, the NAL size form may also indicate the field length of the field that indicates the data size of the NAL unit after conversion to the MP4 file.

Also, the identification information may be regarded as a data unit, and the AU_info table may indicate content of Nal_size_info. At this time, by making conversion_mode multiple-valued, in addition to two operations including deleting and leaving the data unit, a mode for converting data structure of the data unit may be added. Furthermore, identification information for identifying a type of the data unit may be added to the AU_info table. For example, such identification information enables discrimination of a type of NAL unit, such as the NAL unit of SPS in MPEG-4 AVC or HEVC, NAL unit of PPS, and NAL unit of slice. Alternatively, such identification information enables discrimination of the LATM header or LATM payload of MPEG-4 AAC, etc. Furthermore, a field that indicates whether the data unit is encrypted may be provided separately.

A data unit with different conversion_mode may be stored in a different TS packet. Also, when conversion_mode is 2, the data unit to be stored in the sample entry as header information may be stored in the TS packet as plain text.

Regarding encryption, only the NAL unit of slice data may be encrypted, and other sections may be plain text. This is because encryption is performed on a TS packet-by-TS packet basis, plain text and encrypted section cannot be intermingled in the payload of the TS packet, the data size of AUD is small, and storing AUD as an independent packet leads to increase in stuffing and decrease in a multiplexing efficiency. Also, when the boundary of the encrypted NAL unit data of slice is not aligned at an end of the payload of the TS packet, stuffing is required. Stuffing may be performed by a method for using adaptation_field of the TS packet header, or a method for inserting data such as a Filler Data NAL unit or SEI for Filler Data into the coded data. When adaptation_field of the TS packet header is used, the adaptation_field needs to be plain text, but switching processing of whether to encrypt a variable-length region imposes a high load. Therefore, when performing stuffing, it is preferable to align the boundary of the NAL unit data at a payload end of the TS packet by using data structure for stuffing in the coded data.

Also, SEI for user data storage (User unregistered SEI) may be inserted into Adaptation field of the TS packet or the access unit, and the size information may be stored in the SEI. In conversion into the MP4 file, the start code form can be converted into the NAL size form, based on the size information on the NAL unit stored by one or more of these methods. Also, information that indicates whether the size information is stored may be stored using information such as the descriptor in MPEG2-TS.

Figure 17:
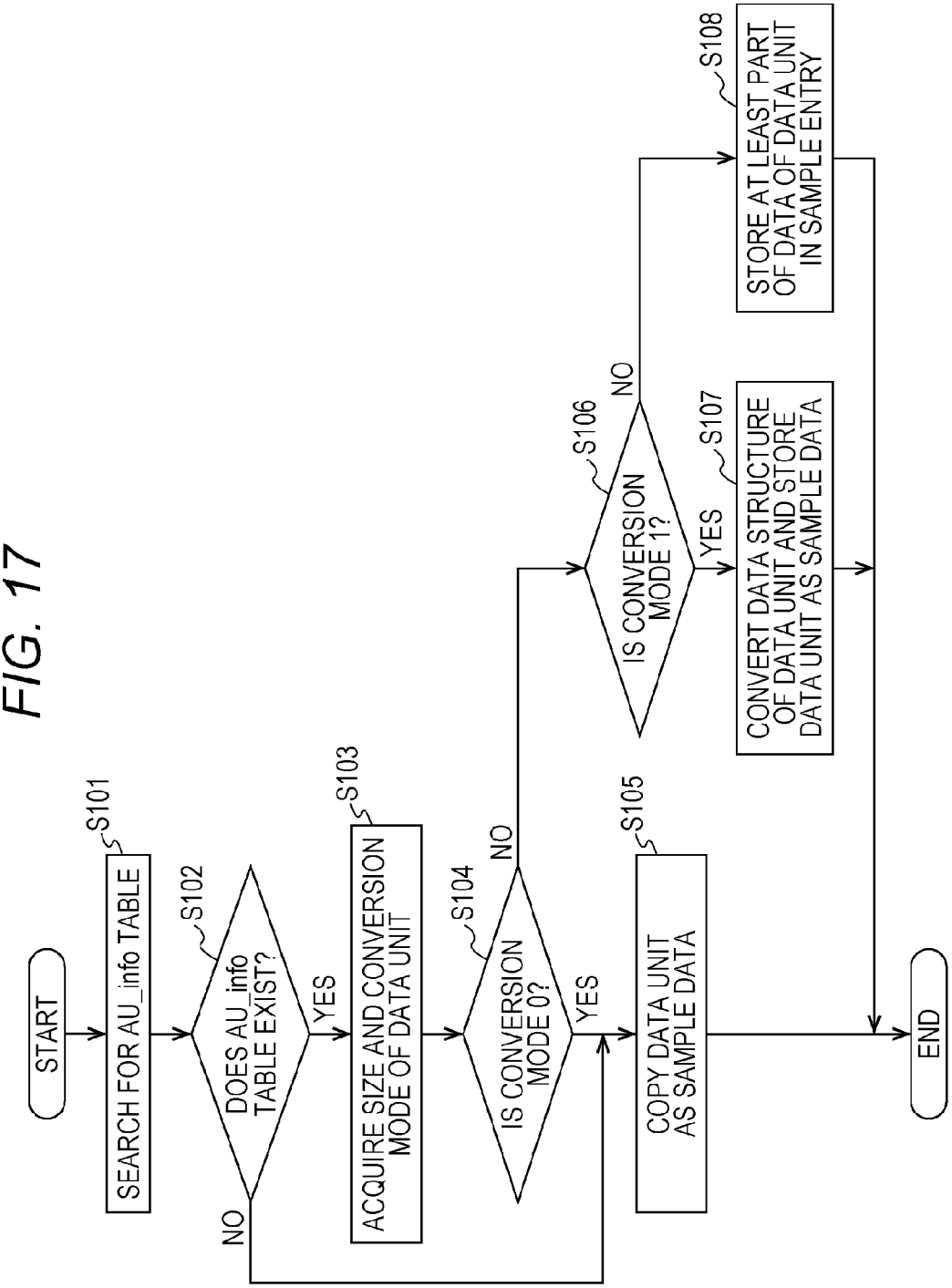
FIG. 17 is a flowchart illustrating a processing operation that the file generating apparatus according to variation 2 of the exemplary embodiment generates an MP4 file.

FIG. 17 is a flowchart illustrating a processing operation of file generating apparatus 100 according to the present variation generating the MP4 file. Specifically, this flowchart illustrates an example of the processing operation of converting the transport stream to the MP4 file with reference to the AU_info table illustrated in FIG. 13C.

Supplementary information search unit 101 of file generating apparatus 100 searches for the AU_info table arranged at top or the like of the payload of the PES packet (step S101). Next, based on a result of the search, supplementary information analysis unit 103 determines whether the AU_info table exists (step S102). When it is determined here that the AU_info table exists ("Yes" in step S102), supplementary information analysis unit 103 acquires the data size of each data unit and a conversion mode of the data unit included in the AU_info table (step S103). On the other hand, when it is determined that the AU_info table does not exist ("No" in step S102), sample generation unit 104a of generation unit 104 regards the access unit separated from the PES packet as a data unit, and copies and pastes the data unit on mdat as sample data (step S105). When one access unit is stored in one PES packet, sample generation unit 104a regards the payload of the PES packet as data for one access unit, and separates the payload. When a plurality of access units is stored in one PES packet, or when the access unit is fragmented and stored in the PES packet, sample generation unit 104a searches for the boundary of each access unit in the coded data, and separates those access units.

After step S103, supplementary information analysis unit 103 determines whether the conversion mode is 0 (step S104). When it is determined that the conversion mode is 0 ("Yes" in step S104), sample generation unit 104a copies and pastes the data unit corresponding to the conversion mode on mdat as sample data (step S105). On the other hand, when it is determined that the conversion mode is not 0 ("No" in step S104), supplementary information analysis unit 103 determines whether the conversion mode is 1 (step S106). When it is determined here that the conversion mode is 1 ("Yes" in step S106), sample generation unit 104a converts data structure of the data unit corresponding to the conversion mode, and stores, in mdat, the data unit that has data structure after conversion as sample data (step S107). For example, sample generation unit 104a converts the form of the identification information on the NAL unit boundary from the start code form into the NAL size form. On the other hand, when it is determined that the conversion mode is not 1 but 2 ("No" in step S106), sample entry generation unit 104b stores at least part of data of the data unit in the sample entry, without storing the data unit corresponding to the conversion mode in mdat (step S108). For example, sample entry generation unit 104b stores the NAL unit of each of SPS and PPS in MPEG-4 AVC in the sample entry. Alternatively, sample entry generation unit 104b separates AudioSpecificConfig( ) from the LATM header of MPEG-4

AAC, and stores AudioSpecificConfig( ) in the sample entry. Of the data of the data unit, although a section to be stored in the sample entry is specified in the coding scheme in advance, supplementary data for specifying a storage section in the sample entry may be indicated in the AU_info table.

Note that in the above-described exemplary embodiment and each variation, each component may be made of dedicated hardware, or may be implemented through execution of a software program suitable for each component. Each component may be implemented by a program execution unit, such as a CPU or a processor, reading and executing the software program recorded in a recording medium, such as a hard disk or a semiconductor memory. Here, software that implements the file generating apparatus according to the above-described exemplary embodiment and each variation causes a computer to execute each step included in the flowchart illustrated in FIG. 8 or FIG. 17.

Although the file generating apparatus according to one or more aspects has been described above based on the exemplary embodiment and each variation, the present disclosure is not limited to this exemplary embodiment and each variation. The exemplary embodiment and each variation to which various modifications conceivable by a person skilled in the art are made, and aspects that are made by combining elements of the exemplary embodiment and each variation may also be within the scope of the one or more aspects as long as such aspects do not depart from the gist of the present disclosure.

For example, in the exemplary embodiment and each variation, a file made by MPEG2-TS is used as the original file. However, the original files may be any file or transport stream other than the file of MPEG2-TS, if the original file is a file made in a file format different from MP4.

Also, the present disclosure may also include the following cases.

(1) Specifically, each of the above-described apparatuses is a computer system that includes devices such as a microprocessor, a ROM, a RAM, a hard disk unit, a display unit, a keyboard, and a mouse. The RAM or hard disk unit stores a computer program. Each apparatus achieves a function thereof by the microprocessor running in accordance with the computer program. Here, the computer program is constructed through combination of a plurality of instruction codes that indicate directions to the computer for achieving a predetermined function.

(2) Part or all of the components that constitute each of the apparatuses may be made of one system LSI (Large Scale Integration circuit). The system LSI is a super-multifunctional LSI manufactured by integration of a plurality of elements on one chip, and specifically is a computer system that includes a microprocessor, a ROM, a RAM, etc. The RAM stores the computer program. The system LSI achieves the function thereof by the microprocessor operating in accordance with the computer program.

(3) Part or all of the components that constitute each apparatus described above may include an IC card or a standalone module detachable from each apparatus. The IC card or the module is a computer system that includes a microprocessor, a ROM, a RAM, etc. The IC card or the module may include the above-described super-multifunctional LSI. The IC card or the module achieves the function thereof by the microprocessor operating in accordance with the computer program. This IC card or this module may be tamper-proof.

(4) The present disclosure may be the method described above. Also, the present disclosure may be a computer program that causes a computer to implement these methods, and may be a digital signal made of the computer program.

The present disclosure may be the computer program or the digital signal recorded in a computer-readable recording medium, such as a flexible disk, a hard disk, a CD-ROM, an MO, a DVD, a DVD-ROM, a DVD-RAM, a BD (Blu-ray (registered trademark) Disc), and a semiconductor memory, for example. Also, the present disclosure may be the above-described digital signal recorded in these recording media.

Also, the present disclosure may transmit the computer program or the digital signal via electric telecommunication lines, wireless or wired communication lines, a network represented by the Internet, data broadcasting, etc.

Also, the present disclosure may be a computer system including a microprocessor and a memory, the memory may store the computer program, and the microprocessor may operate in accordance with the computer program.

Also, the present disclosure may be implemented by another independent computer system through recording of the program or the digital signal in the recording medium and transportation, or through transportation of the program or the digital signal via the network or the like.

(5) The above-described exemplary embodiment and the variations may be combined with one another.

Although the data transmission method, the data playback method, etc. according to one or more aspects of the present disclosure have been described above on the basis of the exemplary embodiment, the present disclosure is not limited to this exemplary embodiment. The present exemplary embodiment to which various modifications conceivable by a person skilled in the art are made, and exemplary embodiments that are made by combining elements of different exemplary embodiments may also be within the scope of the one or more aspects of the present disclosure as long as such aspects do not depart from the gist of the present disclosure.

The present disclosure produces an effect of reducing the processing load. The present disclosure is applicable, for example, to an apparatus that converts the file format from MPEG2-TS to MP4, and can be used for devices such as a smart phone and a tablet, for example.

What is claimed is:

1. A file generating method for generating an MP4 file, the file generating method comprising:
    acquiring an original file made in a file format different from MP4;
    acquiring a difference file including data that is not included in the original file;
    acquiring a procedure file indicating a procedure for generating the MP4 file; and
    generating the MP4 file by combining the data included in the difference file with data included in the original file in accordance with the procedure indicated in the procedure file, wherein
    in acquisition of the original file, the original file in plain text is acquired, and
    in generation of the MP4 file,
        every time a section that constitutes the original file is acquired, a portion of the MP4 file corresponding to the section is generated and encrypted, and
        every time the portion that constitutes the MP4 file is encrypted, the section of the original file corresponding to the portion is deleted.

2. The file generating method according to claim 1, wherein in acquisition of the original file, the original file made in a file format of MPEG2-TS is acquired.

3. The file generating method according to claim 1, wherein in acquisition of the original file, the difference file, and the procedure file, acquisition is performed through reading of the original file, the difference file, and the procedure file from an optical disc.

4. The file generating method according to claim 1, wherein
the procedure file describes ranges of a plurality of respective sections included in the difference file, and ranges of a plurality of respective sections included in the original file, so that the ranges of the sections included in the difference file and the ranges of the sections included in the original file are arranged alternately, and
in generation of the MP4 file, the MP4 file is generated through combination of the sections indicated by the respective ranges in order of the respective ranges described in the procedure file.

5. The file generating method according to claim 4, wherein
the ranges of the plurality of respective sections included in the difference file are described in the procedure file in data size, and
the ranges of the plurality of respective sections included in the original file are described in the procedure file in starting position and data size of the sections.

6. The file generating method according to claim 1, wherein
the data size of the MP4 file is described in the procedure file, and
the file generating method further comprises determining whether a medium has free space for recording the MP4 file based on the data size of the MP4 file described in the procedure file.

7. The file generating method according to claim 1, wherein
an attribute of the MP4 file is described in the procedure file, and
the file generating method further comprises reading the attribute described in the procedure file.

8. The file generating method according to claim 1, wherein
a buffer size required for playback of the MP4 file is described in the procedure file, and
the file generating method further comprises reading the buffer size described in the procedure file.

9. The file generating method according to claim 1, wherein
a first file name, which is a name of the original file, and a second file name, which is a name of the difference file, are described in the procedure file, and
the file generating method further comprises specifying a file with the first file name described in the procedure file as the original file, and specifying a file with the second file name described in the procedure file as the difference file.

10. The file generating method according to claim 1, wherein in generation of the MP4 file, MP4-conforming header information that is data included in the difference file is combined with data included in the original file.

11. A file generating apparatus for generating an MP4 file, the file generating apparatus comprising:
an original file acquisition unit that acquires an original file made in a file format different from MP4;
a difference file acquisition unit that acquires a difference file including data that is not included in the original file;
a procedure file acquisition unit that acquires a procedure file indicating a procedure for generating the MP4 file; and
a generation unit that generates the MP4 file by combining the data included in the difference file with data included in the original file in accordance with the procedure indicated in the procedure file, wherein
in acquisition of the original file, the original file in plain text is acquired, and
in generation of the MP4 file,
every time a section that constitutes the original file is acquired, a portion of the MP4 file corresponding to the section is generated and encrypted, and
every time the portion that constitutes the MP4 file is encrypted, the section of the original file corresponding to the portion is deleted.

* * * * *